US012386630B1

(12) United States Patent
Thiruchengode Vajravel et al.

(10) Patent No.: US 12,386,630 B1
(45) Date of Patent: Aug. 12, 2025

(54) SYSTEM AND METHOD FOR REGISTERING AND RELAYING CUSTOM EVENTS AND NOTICES FROM NODE DEVICE TO NODE DEVICE IN PERIPHERAL DEVICE WORKSPACES MANAGED BY A REMOTE PERIPHERAL DEVICE CLOUD ORCHESTRATOR SERVER

(71) Applicant: Dell Products, LP, Round Rock, TX (US)

(72) Inventors: Gokul Thiruchengode Vajravel, Bangalore (IN); Srinivasa Ragavan Rajagopalan, Bangalore (IN); Vivek Viswanathan Iyer, Saint Johns, FL (US)

(73) Assignee: DELL PRODUCTS LP, Round Rock, TX (US)

( * ) Notice: Subject to any disclaimer, the term of this patent is extended or adjusted under 35 U.S.C. 154(b) by 20 days.

(21) Appl. No.: 18/429,557

(22) Filed: Feb. 1, 2024

(51) Int. Cl.
- *G06F 13/10* (2006.01)
- *G06F 9/4401* (2018.01)
- *G06F 9/54* (2006.01)

(52) U.S. Cl.
CPC ............ *G06F 9/4411* (2013.01); *G06F 9/542* (2013.01); *G06F 9/547* (2013.01)

(58) Field of Classification Search
CPC ......... G06F 9/4411; G06F 9/542; G06F 9/547
See application file for complete search history.

(56) References Cited

U.S. PATENT DOCUMENTS

| | | | | |
|---|---|---|---|---|
| 8,780,388 B2 * | 7/2014 | Shirai | ...................... | G06F 3/129 |
| | | | | 358/1.15 |
| 8,850,551 B2 * | 9/2014 | Abe | ....................... | G06F 21/608 |
| | | | | 726/28 |
| 8,966,136 B2 * | 2/2015 | Sip | .......................... | G06F 13/36 |
| | | | | 710/36 |
| 10,481,839 B2 * | 11/2019 | Suzuki | ............... | H04N 1/00244 |
| 11,082,528 B2 * | 8/2021 | Lee | ........................ | H04L 67/60 |
| 11,310,304 B1 | 4/2022 | Iyer | | |
| 11,540,126 B2 * | 12/2022 | Ha | ....................... | G07F 17/0057 |
| 11,662,968 B2 * | 5/2023 | Matsushima | ........... | G06F 3/126 |
| | | | | 358/1.15 |

(Continued)

*Primary Examiner* — Cheng Yuan Tseng
(74) *Attorney, Agent, or Firm* — ProI Intellectual Property Law, PLLC; H. Kenneth Prol

(57) ABSTRACT

An information handling system node includes a hardware processor, a memory device, a power management unit with a peripheral device node operatively coupled to the information handling system node. The hardware processor may execute computer-readable program code of a custom event and device manageability service sub-agent to discover the peripheral device node operatively coupled to the information handling system node including a unique peripheral device identification (ID), request and receive, via a unified device application programming interface module, peripheral device capabilities and event IDs, where the event IDs describe custom events that are transmittable via any bus protocol from the peripheral device node, and register for custom event notifications with the peripheral device node by sending callback messages to the peripheral device node describing which custom events to receive custom event notifications about and setting custom event triggers that trigger the custom event notifications.

20 Claims, 5 Drawing Sheets

(56) References Cited

U.S. PATENT DOCUMENTS

| | | | | |
|---|---|---|---|---|
| 11,977,794 | B2* | 5/2024 | Nozaki | G06F 3/1206 |
| 12,050,793 | B2* | 7/2024 | Lu | A63F 13/355 |
| 12,153,392 | B2* | 11/2024 | Vemuri | G16Y 40/35 |
| 12,160,405 | B2* | 12/2024 | Asveren | H04L 41/082 |
| 2012/0314244 | A1* | 12/2012 | Kurihara | G06F 3/1288 |
| | | | | 358/1.15 |
| 2016/0254968 | A1 | 9/2016 | Ebtekar | |
| 2018/0268393 | A1* | 9/2018 | Cheng | G07G 1/14 |
| 2021/0133318 | A1 | 5/2021 | Andrews | |
| 2022/0012046 | A1* | 1/2022 | Lee | G06F 8/654 |
| 2022/0179958 | A1 | 6/2022 | Robison | |
| 2022/0198043 | A1 | 6/2022 | Kozlowski | |
| 2022/0300313 | A1 | 9/2022 | Iyer | |
| 2022/0391498 | A1 | 12/2022 | Andrews | |
| 2023/0056042 | A1 | 2/2023 | Vichare | |
| 2023/0080498 | A1 | 3/2023 | Barhoumeh | |
| 2023/0134096 | A1 | 5/2023 | Boyapalle | |
| 2023/0153426 | A1 | 5/2023 | Grobelny | |
| 2023/0209321 | A1* | 6/2023 | Suryadi | H04W 4/38 |
| | | | | 455/404.2 |
| 2023/0222200 | A1 | 7/2023 | Grobelny | |
| 2023/0315286 | A1* | 10/2023 | Ebara | G06F 3/0604 |
| | | | | 711/154 |
| 2023/0325522 | A1 | 10/2023 | Kozlowski | |
| 2024/0020212 | A1 | 1/2024 | Andrews | |
| 2024/0256199 | A1* | 8/2024 | Hamada | G06F 3/1255 |
| 2024/0380615 | A1* | 11/2024 | Jeon | H04L 9/0833 |

* cited by examiner

SYSTEM AND METHOD FOR REGISTERING AND RELAYING CUSTOM EVENTS AND NOTICES FROM NODE DEVICE TO NODE DEVICE IN PERIPHERAL DEVICE WORKSPACES MANAGED BY A REMOTE PERIPHERAL DEVICE CLOUD ORCHESTRATOR SERVER

FIELD OF THE DISCLOSURE

The present disclosure generally relates to registering and relaying custom events from a first node device to a second node device within a peripheral device workspace managed by a remote peripheral device cloud orchestrator server. More specifically, the present specification describes the registering and relaying custom event notifications from a peripheral device node to an information handling system node or other peripheral device node managed by via unified device application programming interfaces within the peripheral device workspace including data notices and instructions to and from the peripheral device node and the remote peripheral device cloud orchestrator server.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more applications such as a gaming application, a videoconferencing application, work productivity application or other software applications. Information handling systems may be networked and managed by a remote server system. Further, the information handling system may include one or more peripheral devices operatively coupled to the information handling system for operation with the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
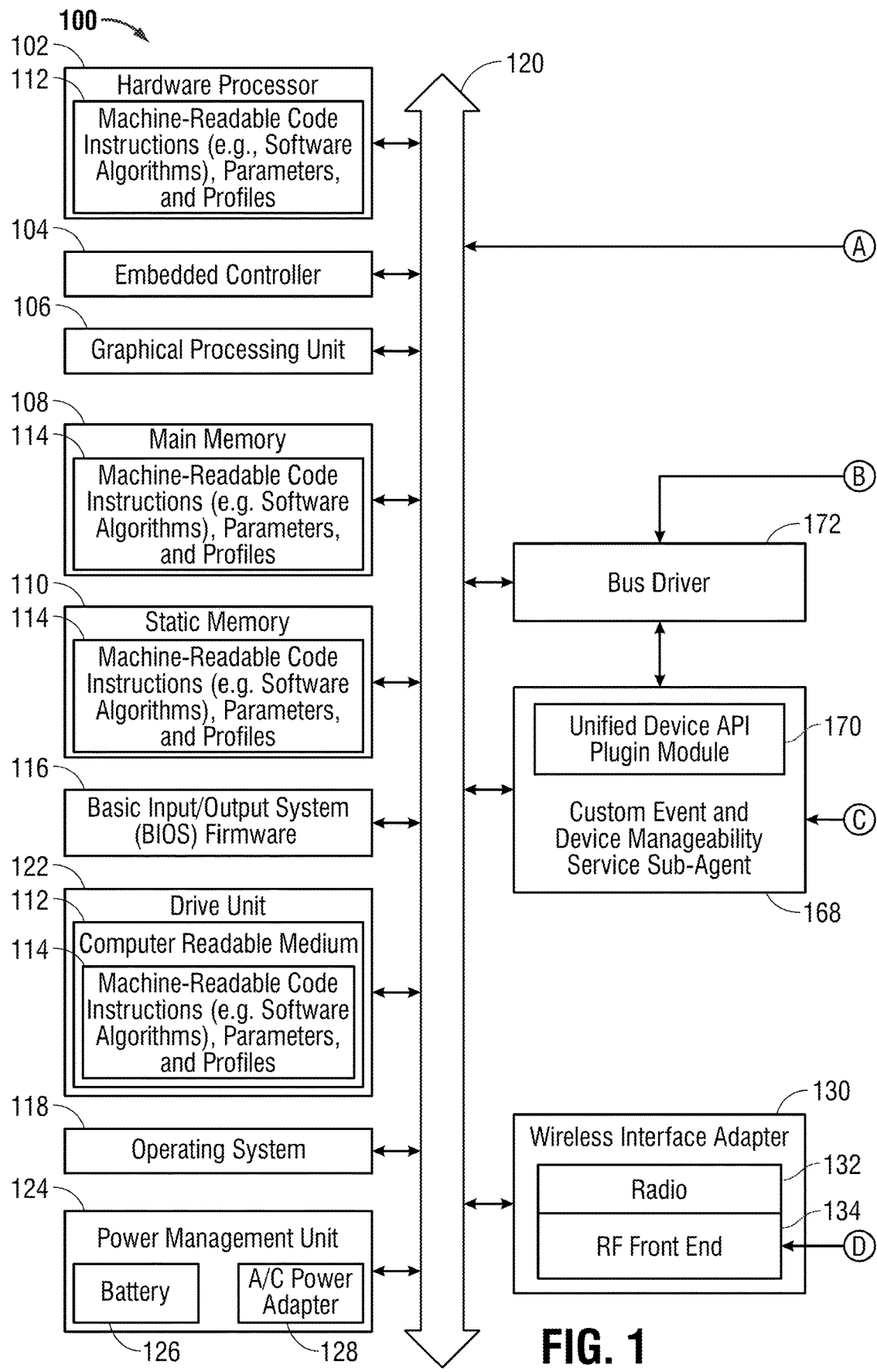
FIG. 1 is a block diagram illustrating an information handling system operatively coupled to one or more peripheral device nodes and operatively coupled to cloud orchestrator server used to manage the information handling system and peripheral device nodes and monitor for customized event notifications from the peripheral device nodes according to an embodiment of the present disclosure.
Figure 1:
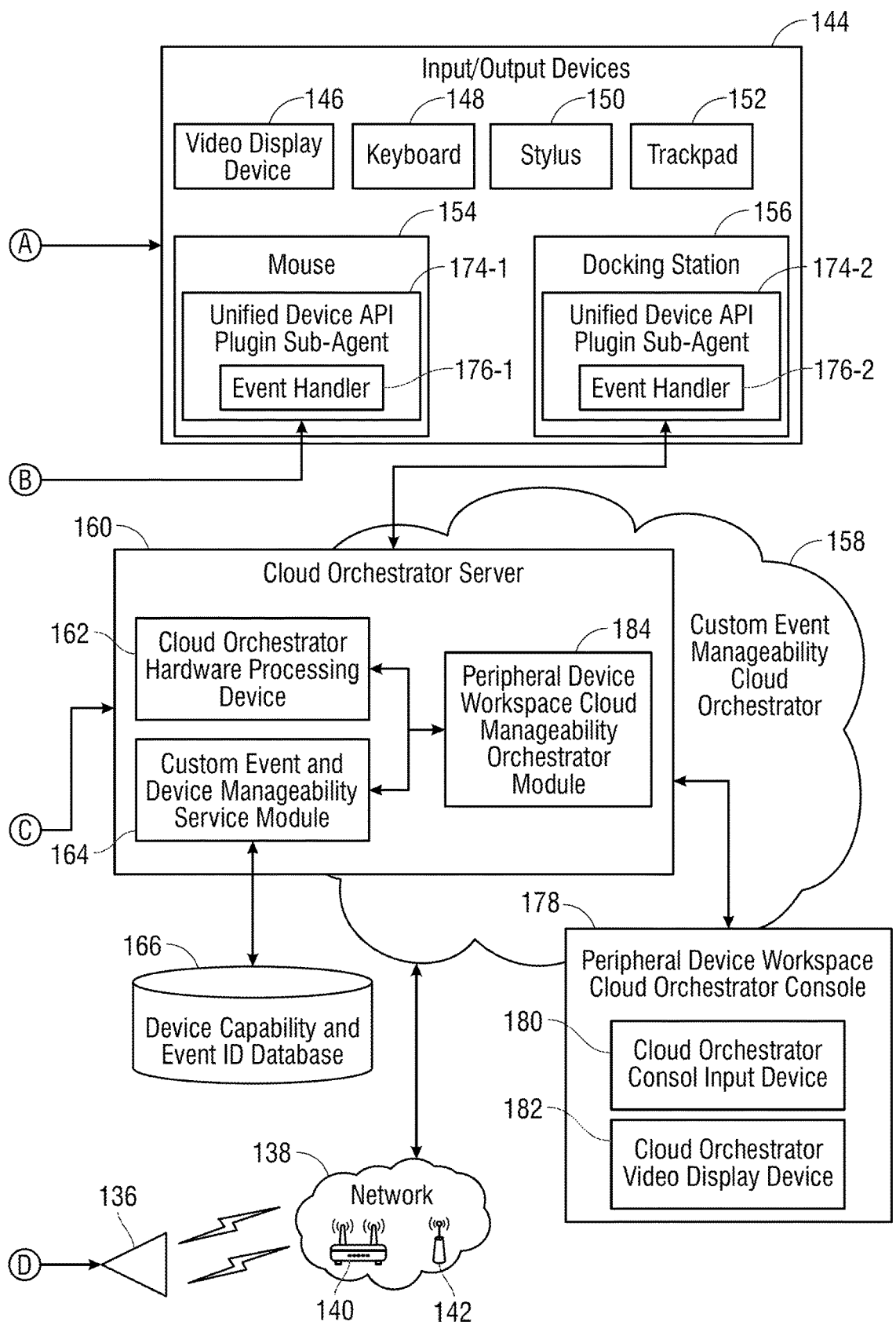

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

A user may oftentimes use an information handling system in a peripheral device workspace. In this context, a peripheral device workspace can be viewed as an environment that includes a user information handling system (e.g., a laptop) as one possible anchor node and one or more peripheral devices, also referred to as peripherals as peripheral device nodes, that are connected to the user information handling system node at an identified location. In an embodiment, each of the information handling system, smart devices, and peripherals operatively coupled at a location may be referred to as node devices. A set of environmental context data may be determined for a formed peripheral device workspace and may include, for example, identification data for a physical location, networked location, time of day, applications being executed, wireless or wired connection capabilities, security credentials for a user, user identification, and other factors. Node devices may commonly include, in some embodiments, internal or external devices such as displays, a keyboard, a mouse, a webcam, a printer, a speaker, a fingerprint scanner, a trackpad, and a stylus, among others that may be integrated peripheral devices in a primary information handling system node (e.g., a laptop) or separate, external peripheral device nodes. In embodiments herein, a peripheral device workspace may include a wired or wireless dock as at least one example of a smart device node by which the user information handling system connects to some or all the secondary, external node devices including other smart device nodes having some compute or input/output (networking) capabilities. Such smart device nodes may operate as backup or replace the user information handling system as an anchor node in the peripheral device workspace in some embodiments herein.

As such, a formed peripheral device workspace may oftentimes be used for associating a plurality of peripheral devices with the information handling system. In an embodiment, after the creation of the workspace, an information technology decision maker (ITDM) may provide operational policies to the device nodes within the workspace including the information handling system describing how the device nodes are to operate within the workspace and how they interact with each other. In other embodiments, operational policies may be automatically generated by execution of the peripheral device workspace cloud orchestrator at a peripheral device workspace cloud orchestrator server that manages the peripheral device workspace. According to embodiments herein, the anchor information handling system node within the workspace may gather information regarding the individual node devices (e.g., peripheral devices operatively coupled to the anchor information handling system node). This data is gathered using communication requests and requires the individual peripheral devices to send this data only in a solicited manner upon request from an anchor information handling system. An issue arises, however, when this data, including operating events occurring at the peripheral device node not normally transmitted, is sent to the anchor information handling system node only upon request or cannot be sent due to limitations of the connected bus protocol. For example, where the peripheral device is a webcam, only those events related to the video frames captured by the webcam are sent to the anchor information handling system node because those events sent are limited only to the universal serial bus (USB) video class specifications and the channel is opened upon a request by the anchor information handling system to record images such as for a videoconferencing application. In another example where the peripheral device is a Bluetooth® keyboard, the events sent to the anchor information handling system node (also called an information handling system) are limited to only those events related to key actuations performed by a user at the keyboard because those events sent are limited only to the human interface device (HID) specifications and subject to the open channel for receiving keystroke indications only from the keyboard peripheral device node. These limitations, therefore, limit the type of events that can be sent from any individual peripheral device and further prevents custom events from being received that inform the user, a managing peripheral device workspace cloud orchestrator, and/or an ITDM of the occurrence of those types of events or custom events at the individual peripheral device nodes operatively coupled to the information handling system node. Further, different communication protocols may be used in communication among different peripheral device nodes to the information handling system node in a peripheral device workspace.

The present specification describes a system and method of registering for and creating custom events at one or more peripheral device nodes operatively coupled to an information handling system node in a peripheral device workspace. As described herein, this information handling system may be an anchor information handling system node within a peripheral device workspace that is operatively coupled to one or more peripheral device nodes at a location. The information handling system node may include a hardware processor, a memory device, a power management unit (PMU) to provide power to the hardware processor and memory device, and a peripheral device node operatively coupled to the information handling system. In an embodiment, the hardware processor of the information handling system node executes computer-readable program code of a custom event and device manageability service sub-agent to discover the peripheral device node operatively coupled to the information handling system including a unique peripheral device identification (ID) of the peripheral device node. Still further, the execution of the computer-readable program code of a custom event and device manageability service sub-agent requests and receives, via unified device application program interface (API) module of the custom event and device manageability service sub-agent, peripheral device capabilities and event identifications (IDs). In an embodiment, these event IDs describe events, such as data generating events like a captured image or keystrokes, occurring at a peripheral device node that are transmittable via any bus protocol from the peripheral device. Still further, the execution of the computer-readable program code of a custom event and device manageability service sub-agent registers for custom event notifications with the peripheral device by sending callback messages to the peripheral device node describing which events, including custom events, to receive notifications about and custom event triggers that trigger the custom event notifications. For example, custom events may include monitoring peripheral device nodes for events not normally reported by the bus protocol used, such as a high temperature event at a webcam that may not be provided according to a video data under a USB protocol. By using the unified device API, each event to be received from each peripheral device may be customized by the user of the information handling system such that each peripheral device is capable of transmitting those events that otherwise would not be able to be transmitted to the information handling system. The unified device API is a developer-agnostic communication protocol that allows the information handling system node to communicate with any peripheral device node operatively coupled to the information handling system node in the peripheral device workspace. In this way, the anchor information handling system node of a peripheral device workspace may provide for communicating these custom events of peripheral device nodes to a peripheral device workspace cloud orchestrator server. By way of example, where the peripheral device node is the webcam, the information handling system node may request and receive the capabilities associated with the peripheral device node and event IDs that describe potential events that are transmittable via any bus protocol. Thus, not only can the webcam peripheral device node transmit those events related to the video frames, but may also be capable of transmitting customized event data, such as data related to detected thermal data at the webcam. Any custom event data may be provided for from peripheral device nodes, such as power error data, error codes for one or more components, or the like. When registering for these event notifications to be received, the information handling system may set certain criteria that indicate to a unified device API plugin sub-agent executing on the peripheral device (e.g., webcam) when these event notifications, such as custom event notifications, are to be sent thereby allowing the information handling system node to receive those customized events and further customize those events as necessary. For example, the information handling system node may determine to receive a custom event notification for a thermal limit threshold that, when exceeded, causes the unified device API plugin sub-agent executing on the peripheral device node to notify the information handling system node that the custom event has been triggered and a common protocol to communicate that custom event data. This event notification would not otherwise have been able to be sent to the information handling system via the USB video class specification. This custom event data for the peripheral device node may then be passed to the peripheral device workspace cloud orchestrator server for monitoring and management according to embodiments herein. However, with the execution of the computer-readable program code of a custom event and device manageability service sub-agent by a hardware processing device of the information handling system node, the information handling system node may direct the peripheral device node (via execution of the unified device API plugin sub-agent executing on the peripheral device) to send these new customized event notifications via the unified device API protocol for transmission and which may be received at the information handing system node or another node device in the peripheral device workspace.

In an embodiment, the information handling system node may communicate with the cloud orchestrator server in order to receive operational policies describing how each requested customized event is to be customized from peripheral device nodes or for receipt and transmittal to the cloud orchestrator server. In one embodiment, the hardware processor of the information handling system node may execute the computer-readable program code of the custom event and device manageability service sub-agent to send the event IDs for one or more peripheral device events received from the peripheral device node to the cloud orchestrator server and request, from a custom event and device manageability service module, identification of the event. In an embodiment, the custom event and device manageability service sub-agent may then receive event policies defining the customization of the custom events from an internet technology decision maker (ITDM) or generated via management modules at a peripheral device workspace cloud orchestrator executing at a cloud orchestrator server wherein the custom event and device manageability service sub-agent sends the event policies to the information handling system node defining how the event IDs are to be customized for custom events for response operational policies at the information handling system node and to enable receipt of data for custom events from peripheral device nodes.

In an embodiment, one or more of the peripheral device nodes may be a smart device node that may optionally communicate directly with the cloud orchestrator server in some embodiments. In an embodiment, registration for custom event notifications with the peripheral device node causes the peripheral device node to communicate with the cloud orchestrator server to transmit the peripheral device capabilities and peripheral IDs to a custom event and device manageability service module executed by a cloud orchestrator hardware processing device of the could orchestrator server. Execution of code instructions for the custom event and device manageability service sub-agent there will apply received event policies defining the customization of the custom events from an ITDM at a peripheral device workspace cloud orchestrator cloud console for the device manageability service sub-agent to send the event policies to the information handling system node defining how the event IDs are to be customized for customized events that may be monitored at the peripheral device node using the unified device API for communication and for response operational policies at the information handling system node to received custom event notifications.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 140, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality. It is appreciated that, in some embodiments herein, the information handling system 100 may be one of a plurality of device nodes as part of a peripheral device workspace. In other embodiments, an information handling system 100 or similar information handling system device or devices may serve as a peripheral device workspace cloud orchestrator server 160 that are operatively coupled to a peripheral device workspace cloud orchestrator consol 178 for executing code instructions of one or more software modules of the peripheral device workspace cloud orchestrator 158 to manage one or more peripheral device workspaces associated with an enterprise as described in embodiments herein. In an embodiment, the cloud orchestrator consol 178 may be an information handling system 100 itself for presenting a graphical user interface that is used by an internet technology decision maker (ITDM) to create hardware device operational policies with one or more peripheral device workspace cloud orchestrator servers 160 to be propagated down to node devices within a peripheral device workspace such as the information handling system 100, a docking station 156, video display device 146, keyboard 148, stylus 150, trackpad 152, mouse 154, or other peripheral device nodes. It is also appreciated that the ITDM operating the peripheral device workspace cloud orchestrator console may also provide polices to the cloud orchestrator server that describes how event notifications from one or more peripheral devices are to be customized as described herein.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system"

shall also be taken to include any collection of systems or sub-systems that individually or jointly execute a set, or plural sets, of instructions to perform one or more computer functions.

The information handling system 100 may include main memory 108, (volatile (e.g., random-access memory, etc.), or static memory 110, nonvolatile (read-only memory, flash memory etc.) or any combination thereof), one or more hardware processing resources, such as a hardware processor 102 that may be a central processing unit (CPU), a graphics processing unit (GPU) 106, embedded controller (EC) 104, or any combination thereof. Additional components of the information handling system 100 may include one or more storage devices such as static memory 110 or drive unit 122. The information handling system 100 may include or interface with one or more communications ports for communicating with external devices, as well as various input and output (I/O) devices 144, such as a docking station 156, a mouse 154, a trackpad 152, a keyboard 148, a stylus 150, a video/graphics display device 146, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 114 that may operate on servers or systems, remote data centers, or on-box in individual client information handling systems according to various embodiments herein. In some embodiments, it is understood any or all portions of instructions (e.g., software algorithms), parameters, and profiles 114 may operate on a plurality of information handling systems 100.

The information handling system 100 may include the hardware processor 102 such as a central processing unit (CPU). Any of the processing resources may operate to execute code that is either firmware or software code. Moreover, the information handling system 100 may include memory such as main memory 108, static memory 110, and disk drive unit 122 (volatile (e.g., random-access memory, etc.), nonvolatile memory (read-only memory, flash memory etc.) or any combination thereof or other memory with computer readable medium 112 storing instructions (e.g., software algorithms), parameters, and profiles 114 executable by the EC 104, hardware processor 102, GPU 106, or any other hardware processing device. The information handling system 100 may also include one or more buses 120 operable to transmit communications between the various hardware components such as any combination of various I/O devices 144 as well as between hardware processors 102, an EC 104, the operating system (OS) 118, the basic input/output system (BIOS) 116, the wireless interface adapter 130, or a radio module, among other components described herein. In an embodiment, the hardware processor 102, EC 104, and/or GPU 106 may execute code instructions for one or more bus drivers 172 in order to transmit this data between the information handling system 100 and its bus 120 and the input/output devices 144 via an external port if they are external or with internal input/output devices 144 as described herein. In another embodiment, the information handling system 100 may be in wired or wireless communication with the I/O devices 144 such as a docking station 156, a keyboard 148, a mouse 154, video display device 146, stylus 150, or trackpad 152 among other peripheral device nodes via a wireless interface adapter 130.

The information handling system 100 further includes a video/graphics display device 146. The video/graphics display device 146 in an embodiment may function as a liquid crystal display (LCD), an organic light emitting diode (OLED), a flat panel display, or a solid-state display. It is appreciated that the video/graphics display device 146 may be wired or wireless and may be an external video/graphics display device 146 that allows a user to increase the desktop area by extending the desktop in an embodiment. Additionally, as described herein, the information handling system 100 may include or be operatively coupled to one or more other I/O devices 144 including a wired or wireless mouse 154 that allows the user to interface with the information handling system 100 via the video/graphics display device 146, a cursor control device (e.g., a trackpad 152, or gesture or touch screen input), a stylus 150, and/or a keyboard 148, among others. Information handling system 100 may also be operatively coupled to a peripheral device 144 such as a docking station 156 or other smart peripheral device having a hardware processing device such as a hardware processor, microcontroller, or other hardware processing resource and which may further operatively couple to one or more additional peripheral devices 144. As described herein, each of these input/output devices 144 may each be a node device associated with the information handling system 100 and may be part of a peripheral device workspace defined for a location and identified with a peripheral device workspace identification value via execution of a peripheral device workspace cloud manageability orchestrator module 184 at cloud orchestrator server 160 according to embodiments of the present disclosure. Various drivers and hardware control device electronics may be operatively coupled to operate the I/O devices 144 according to the embodiments described herein. The present specification contemplates that the I/O devices 144 may be wired or wireless.

A network interface device of the information handling system 100 shown as wireless interface adapter 130 or a network interface device with wired ports can provide connectivity among devices such as with Bluetooth® or to a network 138, e.g., a wide area network (WAN), a local area network (LAN), wireless local area network (WLAN), a wireless personal area network (WPAN), a wireless wide area network (WWAN), or other network. In an embodiment, this network 138 may be operatively coupled to or include a custom event manageability cloud orchestrator 158 that includes one or more servers (e.g., cloud orchestrator server 160) or other computing devices that provide computer system resources as described herein that allow for the creation of peripheral device workspaces and orchestration of different node devices within one or more peripheral device workspaces and monitoring and propagation of operational policies, updates, or instructions within those managed peripheral device workspaces. In embodiments described herein, the wireless interface device 130 with its radio 132, RF front end 134 and antenna 136 is used to communicate with the wireless peripheral devices via, for example, a Bluetooth® or Bluetooth® Low Energy (BLE) protocols. In an embodiment, the WAN, WWAN, LAN, and WLAN may each include an AP 140 or base station 142 used to operatively couple the information handling system 100 to a network 138. In a specific embodiment, the network 138 may include macro-cellular connections via one or more base stations 142 or a wireless AP 140 (e.g., Wi-Fi), or such as through licensed or unlicensed WWAN small cell base stations 142. Connectivity may be via wired or wireless connection. For example, wireless network wireless APs 140 or base stations 142 may be operatively connected to the information handling system 100. Wireless interface adapter 130 may include one or more radio frequency (RF) subsystems (e.g., radio 132) with transmitter/receiver circuitry, modem circuitry, one or more antenna radio frequency (RF) front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes instructions, parameters, and profiles 114 or receives and executes instructions, parameters, and profiles 114 responsive to a propagated signal, so that a hardware device connected to a network 138 may communicate voice, video, or data over the network 138. Further, the instructions 114 may be transmitted or received over the network 138 via the network interface device or wireless interface adapter 130. It is appreciated that any computing device including the cloud orchestrator server 160, the cloud orchestrator console 178, and the information handling system 100 may include a computer-readable medium that includes instructions, parameters, and profiles 114.

The information handling system 100 may include a set of instructions 114 that may be executed to cause the computer system to perform any one or more of the methods or computer-based functions disclosed herein. For example, instructions 114 may be executed by a hardware processor 102, GPU 106, EC 104 or any other hardware processing resource and may include software agents, or other aspects or components used to execute the methods and systems described herein. Various software modules comprising application instructions 114 may be coordinated by an OS 118, and/or via an application programming interface (API) include a unified device API described herein. For example, the unified device API in embodiments herein is a developer-agnostic communication protocol that allows the information handling system node to communicate with any peripheral device node operatively coupled to the information handling system node in the peripheral device workspace. An example OS 118 may include Windows®, Android®, and other OS types. Example APIs may include Win 32, Core Java API, or Android APIs.

In an embodiment, the information handling system 100 may include a disk drive unit 122. The disk drive unit 122 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106 or EC 104, or other microcontroller unit to perform the processes described herein. Similarly, main memory 108 and static memory 110 may also contain a computer-readable medium for storage of one or more sets of machine-readable code instructions, parameters, or profiles 114 described herein. The disk drive unit 122 or static memory 110 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 108, the static memory 110, and/or within the disk drive 122 during execution by the hardware processor 102, EC 104, or GPU 106 of information handling system 100.

Main memory 108 or other memory of the embodiments described herein may contain computer-readable medium (not shown), such as RAM in an example embodiment. An example of main memory 108 includes random access memory (RAM) such as static RAM (SRAM), dynamic RAM (DRAM), non-volatile RAM (NV-RAM), or the like, read only memory (ROM), another type of memory, or a combination thereof. Static memory 110 may contain computer-readable medium (not shown), such as NOR or NAND flash memory in some example embodiments. The applications and associated APIs, for example, may be stored in static memory 110 or on the disk drive unit 122 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 124 (a.k.a. a power supply unit (PSU)). The PMU 124 may include a hardware controller and executable machine-readable code instructions to manage the power provided to the components of the information handling system 100 such as the hardware processor 102 and other hardware components described herein. The PMU 124 may control power to one or more components including the one or more drive units 122, the hardware processor 102 (e.g., CPU), the EC 104, the GPU 106, a video/graphic display device 146, or other wired I/O devices 144 such as the mouse 154, the stylus 150, the keyboard 148, and the trackpad 152 and other components that may require power when a power button has been actuated by a user. In an embodiment, the PMU 124 may monitor power levels and be electrically coupled to the information handling system 100 to provide this power. The PMU 124 may be coupled to the bus 120 to provide or receive data or machine-readable code instructions. The PMU 124 may regulate power from a power source such as the battery 126 or AC power adapter 128. In an embodiment, the battery 126 may be charged via the AC power adapter 128 and provide power to the components of the information handling system 100, via wired connections as applicable, or when AC power from the AC power adapter 128 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 is operatively coupled to a cloud orchestrator server executing code instructions of a custom event manageability cloud orchestrator 158 as part of management by execution of the peripheral device workspace cloud manageability orchestrator module 184 via the wireless interface adapter 130 and network 138 that includes any number of servers, computing devices, and other cloud computing resources such as the cloud orchestrator server 160. The custom event manageability cloud orchestrator 158 may, therefore, execute on any hardware servers and may be distributed over multiple physical locations but act in concert with each other and specifically the cloud orchestrator server 160. Execution of code instructions of the peripheral device workspace cloud manageability orchestrator module 184 facilitates an ITDM to, via hardware device operational policies, create a peripheral device workspace with the one or more node devices (e.g., including the information handling system 100 as an anchor node device and input/output devices 144) forming part of the peripheral device workspace after receiving device enrollment data describing one or more node devices, create hardware device operational policies based on the registered node devices detected within the one or more created peripheral device workspaces, and apply the hardware device operational policies to the created peripheral device workspace. According to some embodiments herein, the ITDM may use the peripheral device workspace cloud orchestrator consol 178 displaying a graphical user interface to define the customization of the custom events to be detectable at a peripheral device node in a peripheral device workspace along with executing code instructions of a custom event manageability cloud orchestrator 158. In an embodiment, a custom event device manageability service sub-agent 168 sends the event policies to the information handling system node at a peripheral device workspace defining how the event IDs for events or actions at peripheral device nodes or other node devices that may generate data relevant to monitoring tasks of the peripheral device workspace cloud manageability orchestrator module 184 are to be customized as necessary after receiving these customizations at the cloud orchestrator server 160 and peripheral device workspace cloud orchestrator consol 178. It is appreciated that the node devices described herein may include each of the peripheral device nodes operatively coupled to the information handling system node 100 acting as a primary or anchor node device in the peripheral device workspaces created and managed according to embodiments herein.

The cloud orchestrator server 160 may be any computing device that may include similar elements as the information handling system 100 such as a memory device, a cloud orchestrator hardware processing device 162, a PMU, and other elements that allow the peripheral device workspace cloud orchestrator server 158 to execute code instructions of peripheral device workspace cloud manageability orchestrator module 184 and custom event and device manageability service module 164 and other software or firmware as described herein. In an embodiment, the cloud orchestrator server 160 may be operatively coupled to the peripheral device workspace cloud orchestrator consol 178. The peripheral device workspace cloud orchestrator consol 178 may be used by the ITDM to create and propagate hardware device operational policies and customization polies used to customize events that occur at or are actions of the peripheral device nodes Execution of code instructions of the peripheral device workspace cloud manageability orchestrator module 184 may monitor for compliant and non-compliant node devices within a peripheral device workspace, propagate one or more hardware device operation policies, propagate optimal settings for any give node device or types of node devices, monitor and provide recommended software/firmware updates to node devices, remediate software/firmware issues among the plurality of node devices, manage dynamic peripheral device workspace sessions (e.g., associate a user's identification with a peripheral device workspace), enable automatic security updates for node devices within the peripheral device workspace, mange auto-pairing of node devices to other node devices within the peripheral device workspace, and troubleshoot and remediate node deceives from the peripheral device workspace cloud orchestrator server 160. It is appreciated that the peripheral device workspace cloud orchestrator consol 178 may present a graphical user interface to an ITDM to monitor the management by execution of the peripheral device workspace cloud manageability orchestrator module 184 and may further include a cloud orchestrator consol input device 180 and a cloud orchestrator consol video display device 182 that allows the ITDM to monitor or provide input for these processes and engage with the cloud orchestrator server 160 in an embodiment.

As described herein, the cloud orchestrator server 160 includes a computer-readable program code of a peripheral device workspace cloud manageability orchestrator module 184 that, when executed by the cloud orchestrator hardware processing device 162 of the cloud orchestrator server 160, receives device enrollment data describing a manifest of one or more node devices. Execution of the computer-readable program code of a peripheral device workspace cloud manageability orchestrator module 184 creates a peripheral device workspace with the one or more node devices forming part of the peripheral device workspace for a location and stores the same under a peripheral device workspace identification value at a database, such as device capability and event ID database 166 or another database, accessible by the cloud orchestrator server 160. In the context of the present specification and in the appended claims, a peripheral device workspace may be an ecosystem of node devices (e.g., including peripheral devices coupled to the information handling system 100, a docking station 156, a mouse 154, etc.) connected to a primary or anchor node device such as the information handling system 100. In an embodiment, a peripheral device workspace may also be defined with a peripheral device workspace identification value and part of a user composite peripheral device workspace identifier associated with each of the information handling system 100 and peripheral devices (e.g., input/output devices 144) such that a user may have multiple peripheral device workspaces having peripheral device workspace identification values associated with the user based on the context and/or environment of each identified peripheral device workspace. For example, a user composite peripheral device workspace identifier may be used to define a first peripheral device workspace at a home office having a first peripheral device workspace identification value, a second peripheral device workspace at a work office having a second peripheral device workspace identification value, a third peripheral device workspace at a different location (e.g., a coffee shop) having a third peripheral device workspace identification value, and other peripheral device workspaces that can be defined by both the node devices included within the peripheral device workspace and the location of the peripheral device workspace (e.g., defined by location data such as GPS data as well as network data) and having a having a peripheral device workspace identification value.

In an embodiment, the execution of computer-readable program code of the peripheral device workspace cloud manageability orchestrator module 184 causes the cloud orchestrator server 160 to receive hardware device operational policies based on the registered node devices detected within the one or more created peripheral device workspaces having peripheral device workspace identification values. In an embodiment, the hardware device operational policies are automatically generated from execution of code instructions of software modules for the peripheral device workspace cloud manageability orchestrator module 184 in the course of managing the peripheral device workspaces or received from the peripheral device workspace cloud orchestrator consol 178 as initiated by the ITDM.

The ITDM may be any internet technology decision maker that may decide the hardware device operational policies to be associated with peripheral device workspaces formed at the cloud orchestrator server 160 and having peripheral device workspace identification values. For example, the ITDM may decide that certain types of node devices are not allowed to be operatively coupled to a primary or anchor node device due to potential security issues associated with those types of node devices. In another example, the ITDM may be any internet technology decision maker that may decide which settings for each of the node devices, including the primary or anchor node device, is an optimal and desired setting to be used. In an embodiment, execution of code instructions of the computer-readable program code of a peripheral device workspace cloud manageability orchestrator module 184 may automatically generate or the ITDM may create these hardware device operational policies and desired settings at the peripheral device workspace cloud orchestrator consol 178 which propagates these hardware device operational policies to the cloud orchestrator server 160 executing the peripheral device workspace cloud manageability orchestrator module 184. Upon generation or receipt of these hardware device operational policies, the peripheral device workspace cloud manageability orchestrator module 184 may propagate these hardware device operational policies to each of the device nodes within the created peripheral device workspace thereby eliminating the need for the ITDM to manually address each device node to propagate these hardware device operational policies. As described in embodiments herein, certain policies may affect the customization of event notifications sent from the input/output peripheral device nodes 144 to the information handling system node 100 in a peripheral device workspace. This allows an ITDM to help facilitate the customization process associated with creating customized event notifications at the information handling system node 100 to enable communications of customized event notifications with one or more peripheral device nodes that may be otherwise unavailable. Such customized event notifications or instructions for communication of the same may be sent to or received from a unified device API plugin sub-agent 174 within at least one of the peripheral device nodes such as the mouse 154 to a unified device plug in module 170 executing at information handling system node 100 or another node device in the peripheral device workspace.

It is appreciated that forming a peripheral device workspace that includes the information handling system node 100 and its peripheral device nodes (e.g., input/output devices 144) may facilitate the customization of the event notifications to be received by the information handling system node 100 from those peripheral device nodes within the workspace for various types of events generated at the peripheral device nodes such a custom events for temperature, power defaults or levels, error conditions or hardware performance failures, or the like that may not be otherwise transmitted in the standardized communication protocol linking those peripheral device nodes. Whether or not a peripheral device workspace has been created, the information handling system node 100 may execute computer-readable program code of a custom event and device manageability service sub-agent 168 in order to generate custom event notifications from a peripheral device node operatively coupled to the information handling system node 100. During operation, the hardware processor 102 of the information handling system node 100 executes the computer-readable program code of the custom event and device manageability service sub-agent 168 to discover the peripheral device node operatively coupled to the information handling system node 100 including a unique identification (ID) of the peripheral device node. This discovery process may be initiated after each of the peripheral device nodes have been operatively coupled to the information handling system node 100, connection protocols have been defined, and security verifications between the information handling system node 100 and the peripheral device nodes have been completed. The unique peripheral device IDs of each of the peripheral device nodes may include, in an example embodiment, a make, model, and type of the peripheral device as well as specific identification data such as a serial number that is specific to that peripheral device. The present specification contemplates that other types of identification data may be used to specifically identify each of the peripheral devices.

After identifying each operatively-coupled peripheral device node, the information handling system node 100 may execute the computer-readable program code of the custom event and device manageability service sub-agent 168 to request and receive, via execution of code instructions for a unified device API plugin module 170 of the custom event and device manageability service sub-agent 168, peripheral device node capabilities and event IDs for events that occur at peripheral device nodes. In an embodiment, the event IDs describe events or actions that are transmittable via any bus protocol or the unified device API from the peripheral device node to the information handling system node 100 or another node device in the peripheral device workspace. According to embodiments of the present disclosure, the unified device API is a developer-agnostic communication protocol that allows the information handling system node to communicate with any peripheral device node operatively coupled to the information handling system node in the peripheral device workspace.

As described herein, typical event notifications are limited by the type of bus protocol used by a particular peripheral device node. For example, where the peripheral device node is a webcam, only those events related to the video frames captured by the webcam are sent to the anchor information handling system node because those events sent are limited only to the universal serial bus (USB) video class specifications. In another example where the peripheral device node is a Bluetooth® keyboard, the events sent to an anchor information handling system node or other information handling system node are limited to only those events related to key actuations performed by a user at the keyboard because those events sent are limited only to the human interface device (HID) specifications. These bus protocols limit the number and type of potential event notifications that the information handling system node 100 can receive from each of the peripheral device nodes. Thus, the execution of the computer-readable program code of the custom event and device manageability service sub-agent 168 causes the information handling system 100 to implement code instructions for the unified device API, via execution of the unified device API plugin module 170, that acts as a metadata model and communication framework to allow developers to communicate various other node device system's APIs through a single interface. This allows the information handling system node 100 to communicate the request for the event IDs that describe events at peripheral device nodes in a peripheral device workspace that otherwise would not be available to be received by the information handling system node 100 using a single bus protocol such as USB video class specifications or HID to name a few. Further, event notifications for those event IDs may be communicate via execution of code instructions of that unified device API plugin module 170 and a reciprocal unified device API plugin sub-agent 174-1 at a peripheral device node. Such communication may occur via an operative coupling such as a wired connection or a wireless connection via a wireless interface adapter 130 and managed across the bus 120 of the information handling system node 100 by execution of one or more bus drivers 172. It is appreciated that the request for event IDs from each of the peripheral device nodes may include a request for peripheral device capabilities that includes wired and wireless connection capabilities, battery storage capabilities, hardware processor capabilities (e.g., microcontroller capabilities), wireless communication capabilities, and sensor capabilities where sensors are present in a peripheral device, among other capabilities that define potential event notifications that can be received from each peripheral device node via the unified device API for communication to the information handling system node 100 or other node devices in the peripheral device workspace.

In an embodiment, after having received the device capabilities and event IDs from each of the peripheral device nodes within the peripheral device workspace or, at least, operatively coupled to the information handling system node 100, the information handling system node 100 may not be aware of what events the event IDs are related to. In order to identify the events associated with the event IDs, the information handling system node 100 may communicate these event IDs to the cloud orchestrator server 160 for identification by the server executing, via the cloud orchestrator hardware processing device 162, computer-readable program code of the custom event and device manageability service module 164 according to embodiments herein. In an embodiment, execution of the computer-readable program code of the custom event and device manageability service module 164 accesses a device capability and event ID database 166 in order to identify any event associated with any event ID received by the information handling system node 100 from a peripheral device node using the unified device API plugin module 170 and sent to the cloud orchestrator server 160. Additionally, should the information handling system node 100 not have access to any capability data associated with the capabilities of any given peripheral device node, the execution of the computer-readable program code of the custom event and device manageability service module 164 will access the device capability and event ID database 166 and get that information in embodiments herein. At this point, the cloud orchestrator server 160 may send this information back to the information handling system node 100 for further processing as described herein.

As described herein, execution of code instructions of one or more modules of the peripheral device workspace cloud manageability orchestrator module 184 may generate as part of management tasks or an ITDM at the peripheral device workspace cloud orchestrator consol 178 may create operational policies that may define policies that may be used to define, for example, set event criteria that affect when a peripheral device node sends event notifications to the cloud orchestrator server 160 for management purposes. For example, the information handling system node 100 may, via identification of these event criteria and receipt of these operational policies from the cloud orchestrator server 160, set a thermal limit threshold that, when exceeded at the peripheral device node, causes the unified device API plugin sub-agent 174 executing on the peripheral device provide for communications to notify the information handling system node 100 that the event has been triggered. This event notification is based on the event criteria sent from the information handling system node 100 to the peripheral device node (e.g., a mouse 154) in accordance with the event criteria received by the information handling system node 100 from the cloud orchestrator server 160. The ability to modify event criteria, therefore, allows execution of code instructions of one or more modules of the peripheral device workspace cloud manageability orchestrator module 184 or an ITDM to effectively manage as well as increase the usability of the information handling system node 100 and peripheral device nodes within the peripheral device workspace such that a quality of experience (QoE) is increased and user satisfaction is increased. In an embodiment, the ITDM at the peripheral device workspace cloud orchestrator consol 178 may create policies and event criteria for certain events at certain peripheral devices and have those policies and event criteria stored on the device capability and event ID database 166 for later access by the cloud orchestrator server 160 on behalf of the information handling system 100 as described herein.

It is also appreciated that the event ID is identifiable by the information handling system node 100 without the need for the information handling system node 100 to access the data on the device capability and event ID database 166 at the cloud orchestrator server 160 in some embodiments. In an embodiment, this data may be maintained on an event ID database stored on a memory device (e.g., 108, 110) on the information handling system node 100 for local management tasks and may form part of the machine-readable code instructions 114 associated with the operation of the various peripheral device nodes in some embodiments. Thus, in some embodiments, the systems and methods described herein may be executed without access, by the information handling system node 100 to the cloud orchestrator server 160 and the resources thereon.

During operation and after the information handling system node 100 has received the device capabilities and event ID and after the information handling system node 100 has identified all event IDs associated with any given peripheral device node, the information handling system node 100 may register for custom event notifications with the peripheral device node by sending callback messages to the peripheral device node describing which events to receive notifications about and custom event triggers that trigger the custom event notifications from the peripheral device node. To accomplish this, the information handling system node 100 may execute computer-readable program code of a unified device API plugin module 170 to, via execution of code instructions for a bus driver 172, register for custom event notifications from each peripheral device node. FIG. 1 shows that the peripheral device is a mouse 154. However, the present specification contemplates that other peripheral device nodes and, moreover, a plurality of peripheral device nodes may include a unified device API plugin sub-agent 174 and its event handler 176-1, 176-2 that allows the information handling system node 100 to complete the processes described herein for communication of event notifications from a plurality of different peripheral device nodes in a peripheral device workspace. In the example shown in FIG. 1, the mouse 154 includes a unified device API plugin sub-agent 174 that is responsible for communicating the device capabilities and event IDs back to the information handling system node 100 as described herein. The unified device API plugin sub-agent 174-1 may also cause a microcontroller of the mouse 174 to execute computer-readable program code of the event handler 176-1. Execution of the event handler 176 by the microcontroller of the mouse 154 also causes the mouse 154 to leave open an event call and monitor for occurrences of an event trigger that satisfies the criteria of the registered event by the information handling system node 100. It is appreciated that these events being monitored for at the event handler 176 not only include typical events that would be received by the information handling system 100 from the mouse 154 but also those custom events not usually received from such peripheral devices. In the context of the peripheral device being a mouse 154 as seen in FIG. 1, typical events may include actuation of a button or movement of a scrolling wheel on the mouse 154. Those non-typical events may include events that are not generally relayed from the mouse 154 such as a thermal event that describes that a thermal threshold limit has been reached or exceeded, error or fail conditions of hardware, firmware or software detected, power levels or power faults, or other non-typical events detectable at mouse 154 but not typically communicated via wired or wireless connection. In one example embodiment, the mouse 154 may include a thermal sensor that would shut down the microcontroller of the mouse 154 so that the microcontroller is not damaged by excessive heat. Where the thermal threshold has been set by the information handling system 100 during the event registering process, this customized event may be monitored by the event handler 176 such that when the thermal sensor detects that the thermal threshold has been exceeded, sends an event notification to the information handling system node 100. This notification may allow the information handling system 100 to provide a notification, via the video display device 146 for example, to the user that the microcontroller of the mouse has reached a thermal limit and steps should be taken to remedy this occurrence. Thus, in the embodiments herein, those events that otherwise would not be available to be transmitted from the peripheral device node to the information handling system node 100 using a HID protocol are now transmittable via use of the unified device API protocol by the unified device API plugin module 170 as described herein.

In an embodiment, the execution of the event handler 176 by a microcontroller of the mouse 154 may handle any duplicated registered events. In some embodiments, the information handling system node 100 may register for duplicated requests for an event notification. This accidental or unintentional duplication of event registrations may be handled by the event handler 176 deleting or otherwise ignoring these duplicated event registrations thereby reducing the processing resources associated with the operation of the systems and methods described herein.

As described herein, in some embodiments, the unified device API plugin sub-agent 174-2 of a smart device node may have direct communication with the cloud orchestrator server 160 in order to identify event IDs and set policies that create event triggers at the event handler 176-2 as described herein. As shown in FIG. 1, this smart device node is a docking station 156. A smart device node may be any node within the created workspace that not only has processing resources but also includes networking capabilities that allows the smart device node to be operatively coupled to the cloud orchestrator server 160. Similar processes may be conducted by the cloud orchestrator server 160 that may otherwise be conducted by the information handling system node 100 as described herein. In an embodiment, execution of computer-readable program code of the custom event and device manageability service module 164 may cause the docking station 156 to be registered for event notifications that are to be sent from the docking station 156 to the information handling system node 100. The execution of the computer-readable program code of the custom event and device manageability service module 164 by the cloud orchestrator hardware processing device 162 of the cloud orchestrator server 160 may notify the information handling system node 100 of which events the cloud orchestrator server 160 has registered on the docking station 156 on behalf of the information handling system node 100 and notice of any event IDs and device capabilities discovered during the communication between the docking station 156 and the cloud orchestrator server 160. Again, an ITDM or execution of code instructions of one or more modules of the peripheral device workspace cloud manageability orchestrator module 184 may have set policies that effect the event triggers and may have stored those policies on the device capability and event ID database 166 for the custom event and device manageability service module 164 to use in order to set those triggering events for the customized events registered on the docking station 156 or any other smart device node. This allows the docking station 156 or other smart device node to access the cloud orchestrator server 160 when, for example, the information handling system node 100 is currently incapable of accessing the cloud orchestrator server 160 in order to perform those processes as described herein.

As described herein, the systems and methods allow for peripheral devices to support events that are outside the scope of the bus protocols for any given device. This allows the information handling system 100 to be asynchronously notified of customized events on time for a user, for example, to take remedial actions. Additionally, with the operation of the cloud orchestrator server 160 described herein, policies may be used to modify event criteria used in setting the triggering events at the peripheral device node thereby allowing an ITDM to define these event criteria rather than relying on the data maintained on the information handling system node 100 for such modifications. Still further, the systems and methods described herein allow for extended and cohesive seamless workspace experiences using a generic bus protocol (e.g., the unified device API) that can operate on any connected bus.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
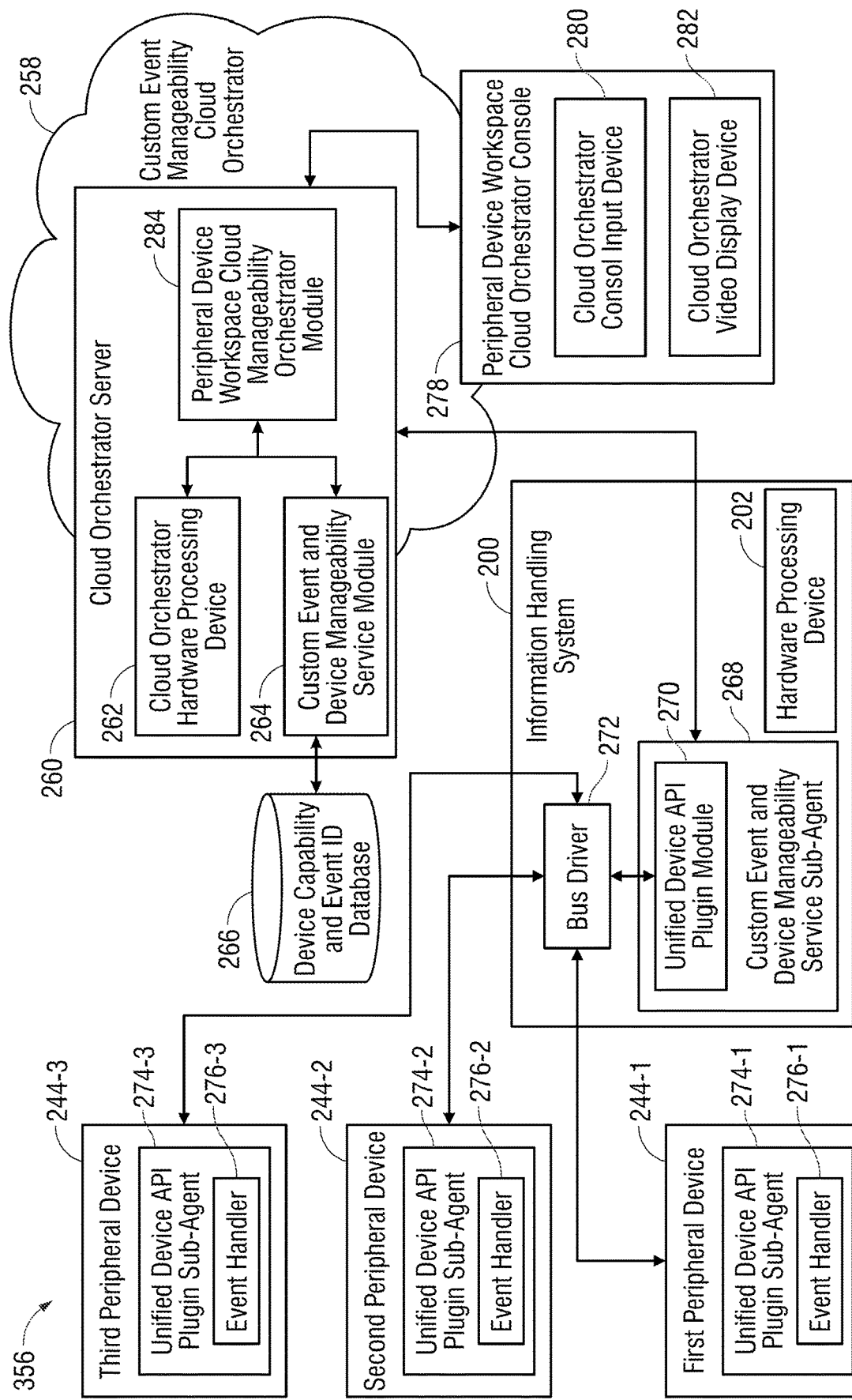
FIG. 2 is a block diagram illustrating an information handling system operatively coupled to a plurality of peripheral device nodes and operatively coupled to cloud orchestrator server used to manage the peripheral device workspace and monitor for customized event notifications from the peripheral device nodes according to another embodiment of the present disclosure.

FIG. 2 is a block diagram illustrating an information handling system operatively coupled to a plurality of peripheral devices and operatively coupled to a cloud orchestrator server or servers used to monitor for customized event notifications from the peripheral devices in a peripheral device workspace according to another embodiment of the present disclosure. The information handling system node 200 shown in FIG. 2 includes multiple peripheral device nodes 244-1, 244-2, 244-3 that each include a unified device API plugin sub-agent 274-1, 274-2, 274-3 and an event handler 276-1, 276-2, 276-3 that are used to allow the information handling system node 200 to register for custom event notifications with the peripheral device node 244-1, 244-2, 244-3 by sending callback messages to the peripheral device nodes 244-1, 244-2, 244-3 describing which events detected or occurring at those peripheral device nodes 244-1, 244-2, 244-3 for which the information handling system node 200 is to receive notifications about and custom event triggers that trigger the custom event notifications.

As described herein, the information handling system node 200 is operatively coupled to a custom event manageability cloud orchestrator 258 executing at cloud orchestrator server 260 via the wireless interface adapter or network interface device and network that includes any number of servers, computing devices, and other cloud computing resources such as the cloud orchestrator server 260. The execution of code instructions of the custom event manageability cloud orchestrator 258 may, therefore, occur on any hardware processing that may be distributed over multiple physical locations but act in concert with each other and specifically occurs on one or more the cloud orchestrator servers 260. The execution of code instructions of the custom event manageability cloud orchestrator 258 as part of the peripheral device cloud management orchestrator module 284 generates or facilitates an ITDM to create a peripheral device workspace with the one or more node devices (e.g., including the information handling system 200 as an anchor node device and input/output devices) forming part of the peripheral device workspace after receiving device enrollment data describing one or more node devices, create hardware device operational policies based on the registered node devices detected within the one or more created peripheral device workspaces, and apply the hardware device operational policies to the created peripheral device workspace. According to some embodiments herein, the ITDM may use a graphical user interface provided at the peripheral device workspace cloud orchestrator consol 278 to define the customization of the custom events to be detectable at a peripheral device node 244-1, 244-2, 244-3.

In an embodiment, a custom event device manageability service sub-agent 268 sends the event policies to the information handling system node 200 defining how the event IDs are to be customized for response operational policies at the information handling system node after receiving these customizations for events to be monitored at peripheral device nodes 244-1, 244-2, 244-3 from the cloud orchestrator server 260 generating custom event notifications. The customization of events and generation of any response tasks to custom event notifications may be set via the ITDM at peripheral device workspace cloud orchestrator consol 278 for monitoring particular peripheral device nodes 244-1, 244-2, 244-3 at a peripheral device workspace. It is appreciated that the node devices 244-1, 244-2, 244-3 described herein are operatively coupled to the information handling system node 200 acting as a primary or anchor node device and the workspaces created may be described as a peripheral device workspace.

The cloud orchestrator server 260 may be any computing device that may include similar elements as the information handling system 200 such as a memory device, a cloud orchestrator hardware processing device 262, a PMU, and other elements that allow the peripheral device workspace cloud orchestrator server 258 to execute code instructions of peripheral device workspace cloud manageability orchestrator module 284 for managing peripheral device workspaces associated with an enterprise, custom event and device manageability service module 264 for managing custom events at peripheral device nodes 244-1, 244-2, 244-3 according to embodiments herein, and other software as described herein. In an embodiment, the cloud orchestrator server 260 may be operatively coupled to the peripheral device workspace cloud orchestrator consol 278. Execution of code instructions for the peripheral device workspace cloud orchestrator server 258 and the peripheral device workspace cloud manageability orchestrator module 284 may automatically generate and propagate hardware device operational policies and customization polices used to customize events at the peripheral device nodes 244-1, 244-2, 244-3 in some embodiments. The peripheral device workspace cloud orchestrator consol 278 may be used by the ITDM to create and propagate hardware device operational policies and customization polices used to customize events at the peripheral device nodes 244-1, 244-2, 244-3 in other embodiments. Execution of code instructions for the peripheral device workspace cloud orchestrator server 258 and the peripheral device workspace cloud manageability orchestrator module 284 will monitor for compliant and non-compliant node devices within a peripheral device workspace, propagate optimal settings for any give node device or types of node devices, monitor and provide recommended software/firmware updates to node devices, remediate software/firmware issues among the plurality of node devices, manage dynamic peripheral device workspace sessions (e.g., associate a user's identification with a peripheral device workspace), enable automatic security updates for node devices within the peripheral device workspace, manage auto-pairing of node devices to other node devices within the peripheral device workspace, and troubleshoot and remediate node devices in the peripheral device workspace being monitored. It is appreciated that the peripheral device workspace cloud orchestrator consol 278 may include a cloud orchestrator consol input device 280 and a cloud orchestrator consol video display device 282 that allows the ITDM to facilitate completing one or more of these processes and engage with the cloud orchestrator server 260 in an embodiment.

As described herein, the cloud orchestrator server 260 includes a computer-readable program code of a peripheral device workspace cloud manageability orchestrator module 284 that, when executed by the cloud orchestrator hardware processing device 262 of the cloud orchestrator server 260, manages peripheral device workspaces by receiving device enrollment data describing one or more node devices 200, 244-1, 244-2, and 244-3 and creates a peripheral device workspace under a peripheral device workspace identification value with a manifest of the one or more node devices 200, 244-1, 244-2, 244-3 forming part of the peripheral device workspace at an identified location. In the context of the present specification and in the appended claims, a peripheral device workspace may be an ecosystem of node devices (e.g., including peripheral devices 244-1, 244-2, 244-3 coupled to the information handling system 200, a docking station, a mouse, etc.) connected to a primary or anchor node device such as the information handling system 200. In an embodiment, a peripheral device workspace may also be defined in a database, such as device capability and event ID database 266 or another database accessible by cloud orchestrator server 260, with the peripheral device workspace identification value and part of a user composite peripheral device workspace identifier associated with each of the information handling system 200 and peripheral devices (e.g., input/output devices) such that a user may have multiple peripheral device workspaces having peripheral device workspace identification values associated with the user based on the context and/or environment of each identified peripheral device workspace. For example, a user composite peripheral device workspace identifier may be used to define a first peripheral device workspace at a home office having a first peripheral device workspace identification value, a second peripheral device workspace at a work office having a second peripheral device workspace identification value, a third peripheral device workspace at a different location (e.g., a coffee shop) having a third peripheral device workspace identification value, and other peripheral device workspaces that can be defined by both the node devices included within the peripheral device workspace and the location of the peripheral device workspace (e.g., defined by location data such as GPS data as well as network data) and having a having a peripheral device workspace identification value.

In an embodiment, the execution of computer-readable program code of the peripheral device workspace cloud manageability orchestrator module 284 causes the cloud orchestrator server 260 to receive from an ITDM or generate as part of management tasks the hardware device operational policies based on the registered node devices detected within the one or more created peripheral device workspaces having peripheral device workspace identification values. In one embodiment, the hardware device operational policies are received from the peripheral device workspace cloud orchestrator consol 278 as initiated by the ITDM. The ITDM may be any internet technology decision maker that may decide the hardware device operational policies to be associated with peripheral device workspaces formed at the cloud orchestrator server 260 and having peripheral device workspace identification values. For example, the ITDM may decide that certain types of node devices are not allowed to be operatively coupled to a primary or anchor node device due to potential security issues associated with those types of node devices. In another example, the ITDM may decide which settings for each of the node devices, including the primary or anchor node device, is an optimal and desired setting to be used. In an embodiment, the ITDM may create these hardware device operational policies and desired settings at the peripheral device workspace cloud orchestrator consol 278 which propagates these hardware device operational policies to the cloud orchestrator server 260 executing the peripheral device workspace cloud manageability orchestrator module 284. In other embodiments execution of code instructions for the peripheral device workspace cloud orchestrator server 258 and the peripheral device workspace cloud manageability orchestrator module 284 may generate one or more hardware device operational policies automatically due to execution of code instructions for managing settings or configurations at the managed peripheral device workspaces. Upon receipt of these hardware device operational policies created at the peripheral device workspace cloud orchestrator consol 278 by the ITDM or generation of the hardware device operational policies, the peripheral device workspace cloud manageability orchestrator module 284 may propagate these hardware device operational policies to each of the device nodes within the created peripheral device workspace thereby eliminating the need for the ITDM to manually address each device node to propagate these hardware device operational policies. As described herein, certain policies may affect the customization of event notifications sent from the peripheral device nodes 244-1, 244-2, 244-3 to the information handling system 200. Thus, execution of code instructions for the peripheral device workspace cloud orchestrator server 258 and the peripheral device workspace cloud manageability orchestrator module 284 facilitates the customization process associated with creating customized event notifications at the information handling system 200 that are sent to a unified device API plugin sub-agent 274-1, 274-2, 274-3 within at least one of the peripheral device nodes 244-1, 244-2, 244-3 in a peripheral device workspace.

It is appreciated that forming a peripheral device workspace that includes the information handling system 200 and its peripheral device nodes 244-1, 244-2, 244-3 (e.g., input/output devices) may facilitate the customization of the event notifications to be received by the information handling system node 200 from those peripheral devices 244-1, 244-2, 244-3 within the peripheral device workspace. The information handling system node 200 may execute computer-readable program code of a custom event and device manageability service sub-agent 268 in order to generate custom event notifications from a peripheral device node 244-1, 244-2, or 244-3 operatively coupled to the information handling system node 200. During operation, the hardware processor 202 executes the computer-readable program code of the custom event and device manageability service sub-agent 268 to discover the peripheral device node 244-1, 244-2, or 244-3 operatively coupled to the information handling system node to retrieve data for the peripheral device node 244-1, 244-2, or 244-3 including a unique peripheral device ID. This discovery process may be initiated after each of the peripheral device nodes 244-1, 244-2, 244-3 have been operatively coupled to the information handling system 200, connection protocols have been defined, and security verifications between the information handling system node 200 and the peripheral device nodes 244-1, 244-2, 244-3 have been completed. The unique peripheral device IDs of each of the peripheral device nodes 244-1, 244-2, 244-3 may include, in an example embodiment, a make, model, and type of the peripheral device as well as specific identification data such as a serial number that is specific to that peripheral device node 244-1, 244-2, or 244-3. The present specification contemplates that other types of identification data may be used to specifically identify each of the peripheral device nodes 244-1, 244-2, or 244-3 and may be stored under a peripheral device ID at database 266 for example.

After identifying each operatively-coupled peripheral device node 244-1, 244-2, 244-3, the information handling system node 200 may execute the computer-readable program code of the custom event and device manageability service sub-agent 268 to request and receive, via a unified device API plugin module 270 of the custom event and device manageability service sub-agent 268, peripheral device capabilities and event IDs. In an embodiment, the event IDs describe events, such as actions or sensed or measure occurrences at peripheral device nodes 244-1, 244-2, 244-3, that are transmittable via any bus protocol including existing standardized bus protocols or one utilized for custom events under the unified device AP of embodiments herein, from the peripheral device node 244-1, 244-2, or 244-3. As described herein, typical event notifications are limited by the type of bus protocol regularly used during operation of the peripheral device node 244-1, 244-2, or 244-3 to communicate with anchor information handling system node 200. For example, where the peripheral device is a webcam, only those events related to the video frames captured by the webcam are sent to the anchor information handling system node because those events sent are limited only to the USB video class specifications. In another example where the peripheral device is a Bluetooth® keyboard, the events sent to the anchor information handling system node (also called an information handling system) are limited to only those events related to key actuations performed by a user at the keyboard because those events sent are limited only to the HID specifications. These bus protocols limit therefore the number and type of potential event notifications that the information handling system 200 can receive from each of the peripheral device nodes 244-1, 244-2, or 244-3.

For other event notifications that may not be communicated on a regularly used bus protocol, the execution of the computer-readable program code of the custom event and device manageability service sub-agent 268 causes the information handling system 200 to implement the unified device API, via execution of the unified device API plugin module 270, that acts as a metadata model to allow developers to communicate various other system's APIs, such as for various manufacturer's peripheral device nodes that may monitor or measure one or more events at the peripheral device nodes 244-1, 244-2, or 244-3, through a single interface. This allows the information handling system node 200 to communicate the request for the event IDs that describe events that otherwise would not be available to be received by the information handling system node 200 using a single bus protocol for regular communications with the peripheral device node 244-1, 244-2, or 244-3 such as USB video class specifications or HID to name a few. It is appreciated that the request for event IDs from each of the peripheral device nodes 244-1, 244-2, or 244-3 includes a request for peripheral device capabilities or events relating to capabilities such as wired and wireless connection capabilities, battery storage capabilities, hardware processor capabilities (e.g., microcontroller capabilities), wireless communication capabilities, and sensor capabilities where sensors are present in a peripheral device node to monitor for such capabilities, among other capabilities that define potential event notifications that can be received from each peripheral device node 244-1, 244-2, or 244-3.

In an embodiment, after having received the device capabilities for which events may be monitored and event IDs from each of the peripheral device nodes 244-1, 244-2, or 244-3 within the workspace or, at least, operatively coupled to the information handling system node 200, the information handling system node 200 may not be aware of what events the event IDs are related to. In order to identify the events associated with the event IDs, the information handling system node 200 may communicate these event IDs to the cloud orchestrator server 260 for identification by the server executing computer-readable program code of the custom event and device manageability service module 264 via the cloud orchestrator hardware processing device 262. In an embodiment, execution of the computer-readable program code of the custom event and device manageability service module 264 causes the custom event and device manageability service module 264 to access a device capability and event ID database 266 in order to identify any event associated with any event ID received by the information handling system 200 and sent to the cloud orchestrator server 260. Such data may be pre-stored at the device capability and event ID database 266 for any type of peripheral device nodes 244-1, 244-2, or 244-3 that may be detected and enrolled in a peripheral device workspace in an enterprise and such a library may be gathered from manufacturer data in some embodiments. Thus, should the information handling system 200 not have access to any capability data associated with the capabilities for which events may be detected or monitored of any given peripheral device node 244-1, 244-2, or 244-3, the execution of the computer-readable program code of the custom event and device manageability service module 264 accesses the device capability and event ID database 266 and get that information or may reach out to third party manufacturing databases for such specifications of peripheral device nodes 244-1, 244-2, 244-3 if needed. At this point, the cloud orchestrator server 260 may send this information back to the information handling system 200 for further processing as described herein.

As described herein, an ITDM may create policies at the peripheral device workspace cloud orchestrator consol 278 that may define operational policies for peripheral device nodes 244-1, 244-2, or 244-3 that may be used to define, for example, set event criteria that affect when a peripheral device node 244-1, 244-2, or 244-3 sends event notifications. For example in one embodiment, the information handling system node 200 may, via identification of these event criteria and receipt of these policies from the peripheral device workspace cloud orchestrator consol 278 via the cloud orchestrator server 260, set a thermal limit threshold that, when exceeded at the peripheral device node 244-1, 244-2, or 244-3, causes the unified device API plugin sub-agent 274-1, 274-2, 274-3 executing on the peripheral device node 244-1, 244-2, or 244-3 to notify the information handling system node 200 that the event has been triggered. In other embodiments, the information handling system node 200 may, via identification of these event criteria for operational policies, set a detection of hardware or firmware errors, a component operational limit threshold, or monitoring for any other event occurrence at the peripheral device node 244-1, 244-2, or 244-3 that, when detected or met at the peripheral device node, causes the unified device API plugin sub-agent 274-1, 274-2, 274-3 executing on the peripheral device node 244-1, 244-2, 244-3 to notify the information handling system node 200 that the event has been triggered. This event notification is based on the event criteria sent from the information handling system node 200 to the peripheral device node 244-1, 244-2, 244-3 (e.g., a mouse) in accordance with the event criteria received by the information handling system node 200 from the cloud orchestrator server 260. Execution of the computer-readable program code of the custom event and device manageability service sub-agent 268 determines, provides for modification of, and propagates event criteria, therefore, increasing monitoring of events at and communication from peripheral device nodes 244-1, 244-2, 244-3 with the information handling system node 200 within the peripheral device workspace such that a QoE is increased and user satisfaction is increased. In an example embodiment, the ITDM at the peripheral device workspace cloud orchestrator consol 278 may create policies and event criteria for certain events at certain peripheral devices and have those policies and event criteria stored on the device capability and event ID database 266 for later access by the cloud orchestrator server 260 on behalf of the information handling system node 200 as described herein.

It is also appreciated that the event ID is identifiable by the information handling system node 200 without the need for the information handling system node 200 to access the data on the device capability and event ID database 266 at the cloud orchestrator server 260. In an embodiment, this data may be maintained on an event ID database stored on a memory device on the information handling system node 200 and may form part of the machine-readable code instructions associated with the operation of the various peripheral device nodes. Thus, in some embodiments, the systems and methods described herein may be executed without access, by the information handling system node 200, to the cloud orchestrator server 260 and the resources thereon.

During operation and after the information handling system node 200 has received the device capabilities and monitoring or sensors available to detect events relating to those capabilities at one or more peripheral device nodes 244-1, 244-2, 244-3 with an event ID and after the information handling system 200 has identified all event IDs associated with any given peripheral device node 244-1, 244-2, or 244-3, the information handling system node 200 may register for custom event notifications with the peripheral device node 244-1, 244-2, or 244-3 by sending callback messages to the peripheral device node 244-1, 244-2, or 244-3 describing which events to receive notifications about and custom event triggers that trigger the custom event notifications. To accomplish this, the information handling system 200 may execute computer-readable program code of a unified device API plugin module 270 to, via a bus driver 272, register for custom event notifications from each peripheral device node 244-1, 244-2, or 244-3 via communications on any bus type available between the information handling system node 200 and the peripheral device node 244-1, 244-2, or 244-3. FIG. 2 shows that multiple peripheral device nodes 244-1, 244-2, 244-3 may be operatively coupled to the information handling system node by multiple bus protocols. However, the present specification contemplates that any number of peripheral device nodes 244-1, 244-2, 244-3 may include a unified device API plugin sub-agent 274-1, 274-2, 274-3 and its event handler 276-1, 276-2, 276-3 that allows the information handling system node 200 executing the unified device API plugin module 270 to communicate via the unified device API to complete the processes described herein for events occurring, detected, or communicated at the peripheral device nodes 244-1, 244-2, 244-3. In the example shown in FIG. 2, each peripheral device 244-1, 244-2, or 244-3 includes a unified device API plugin sub-agent 274-1, 274-2, or 274-3 that is responsible for communicating the device capabilities and event types that may be monitored along with event IDs back to the information handling system node 200 as described herein. The unified device API plugin sub-agent 274-1, 274-2, 274-3 may also cause a microcontroller of the peripheral devices 244-1, 244-2, 244-3 to execute computer-readable program code of their respective event handlers 276-1, 276-2, 276-3. Execution of the event handler 276-1, 276-2, 276-3 by the microcontroller of the peripheral devices 244-1, 244-2, 244-3 also causes the peripheral device nodes 244-1, 244-2, 244-3 to leave open an event call and monitor for occurrences of an event trigger that satisfies the criteria of the registered event by the information handling system node 200 to receive any relevant event notifications via the unified device API communication on any bus type. It is appreciated that these events being monitored for at the event handler 276-1, 276-2, 276-3 not only include typical events that would be received by the information handling system 200 from the peripheral devices 244-1, 244-2, 244-3 but also those custom events not usually received from such peripheral devices 244-1, 244-2, 244-3. In the context of the peripheral device being a mouse, for example, typical events may include actuation of a button or movement of a scrolling wheel on the mouse. Those non-typical events may include events that are not generally relayed from the mouse such as a thermal event, hardware, firmware or software failure or performance event, or other monitored event that describes that a trigger such as a thermal threshold limit has been triggered, reached or exceeded. In one example embodiment, the mouse may include a thermal sensor that would shut down the microcontroller of the mouse so that the microcontroller is not damaged by excessive heat. Where the thermal threshold has been set by the information handling system node 200 during the event registering process in such an example embodiment, this customized event may be monitored by the event handler 276-1, 276-2, or 276-3 such that when the thermal sensor detects that the thermal threshold has been exceeded, sends an event notification to the information handling system node 200 enabled by the unified device API. This notification may allow the information handling system node 200 to provide a notification, via the video display device for example, to the user that the microcontroller of the mouse has reached a thermal limit and steps should be taken to remedy this occurrence. Such node device to node device communication of an event notice of this type in the peripheral device workspace may provide for a more timely response by a user and would not have been available without the execution of code instructions for the unified device API plug-in module 270 via the bus driver 272 and the custom event and device manageability serve sub-agent 268. Thus, in the embodiments herein, those events that otherwise would not be available to be transmitted from the peripheral device to the information handling system node 200 using a HID protocol are now transmittable via use of the unified device API protocol by the unified device API plugin module 270 as described herein. Execution of code instructions of the custom event and device manageability serve sub-agent 268 may monitor for those custom event notifications of the peripheral device node 244-1, 244-2, or 244-3, and execute to provide notification or some automatic execution of instructions pertaining to the custom event notification such as notify the user via a display device, cease or reduce operation of the peripheral device node, or communicate the custom event notification to the cloud orchestrator server 260 in various embodiments.

In an embodiment, the execution of event handler 276-1, 276-2, 276-3 by a microcontroller of the peripheral device nodes 244-1, 244-2, 244-3 may also handle any duplicated registered events. In some embodiments, the information handling system 200 may register for duplicated requests for an event notification. This accidental or unintentional duplication of event registrations may be handled by the event handler 276-1, 276-2, 276-3 deleting or otherwise ignoring these duplicated event registrations thereby reducing the processing resources associated with the operation of the systems and methods described herein such as may be required by limited processing resources of a peripheral device node.

As described herein, in some embodiments, the unified device API plugin sub-agent 274-1, 274-2, 274-3 of a smart device node may have direct communication with the cloud orchestrator server 260 in order to identify event IDs and set policies that create event triggers at the event handler 276-1, 276-2, 276-3 as described herein. In an embodiment, this smart device node may be a docking station. A smart device node may be any node within the created workspace that not only has processing resources but also includes networking capabilities that allows the smart device node to be operatively coupled to the cloud orchestrator server 260. Similar processes may be conducted by the cloud orchestrator server 260 that may otherwise be conducted by the information handling system node 200 as described herein. In an embodiment, execution of computer-readable program code of the custom event and device manageability service module 264 may cause the docking station 256 to be registered for event notifications that are to be sent from the docking station 256 to the information handling system node 200. The execution of the computer-readable program code of the custom event and device manageability service module 264 by the cloud orchestrator hardware processing device 262 of the cloud orchestrator server 260 may notify the information handling system node 200 of which events the cloud orchestrator server 260 has registered on the docking station 256 on behalf of the information handling system node 200 and notice of any event IDs and device capabilities discovered during the communication between the docking station 256 and the cloud orchestrator server 260. Again, an ITDM may have set policies that effect the event triggers and may have stored those policies on the device capability and event ID database 266 for the custom event and device manageability service module 264 to use in order to set those triggering events for the customized events registered on the docking station 256 or any other smart device node. This allows the docking station 256 or other smart device node to access the cloud orchestrator server 260 when, for example, the information handling system node 200 is currently incapable of accessing the cloud orchestrator server 260 in order to perform those processes as described herein.

As described herein, the systems and methods allow for peripheral devices to support events that are outside the scope of the regular bus protocols for any given peripheral device node 244-1, 244-2, 244-3. This allows the information handling system node 200 to be asynchronously notified of customized events on time for a user, for example, to take remedial actions if necessary by enabling communications via a unified device API for monitoring events at the peripheral device nodes 244-1, 244-2, or 244-3 that may not be otherwise communicated. Additionally, with the operation of the cloud orchestrator server 260 described herein, operational policies may be used to modify event criteria used in setting the triggering events at the peripheral device node 244-1, 244-2, or 244-3 thereby allowing an ITDM to define these event criteria rather than relying on the data maintained on the information handling system node 200 for such modifications. Still further, the systems and methods described herein allow for extended and cohesive seamless workspace experiences to enhance monitoring and management of peripheral device nodes 244-1, 244-2, 244-3 by a cloud orchestrator server 260 using a generic bus protocol (e.g., the unified device API) that can operate on any connected bus to provide event notifications from peripheral device nodes 244-1, 244-2, 244-3 via another node device such as the information handling system node 200.

Figure 3:
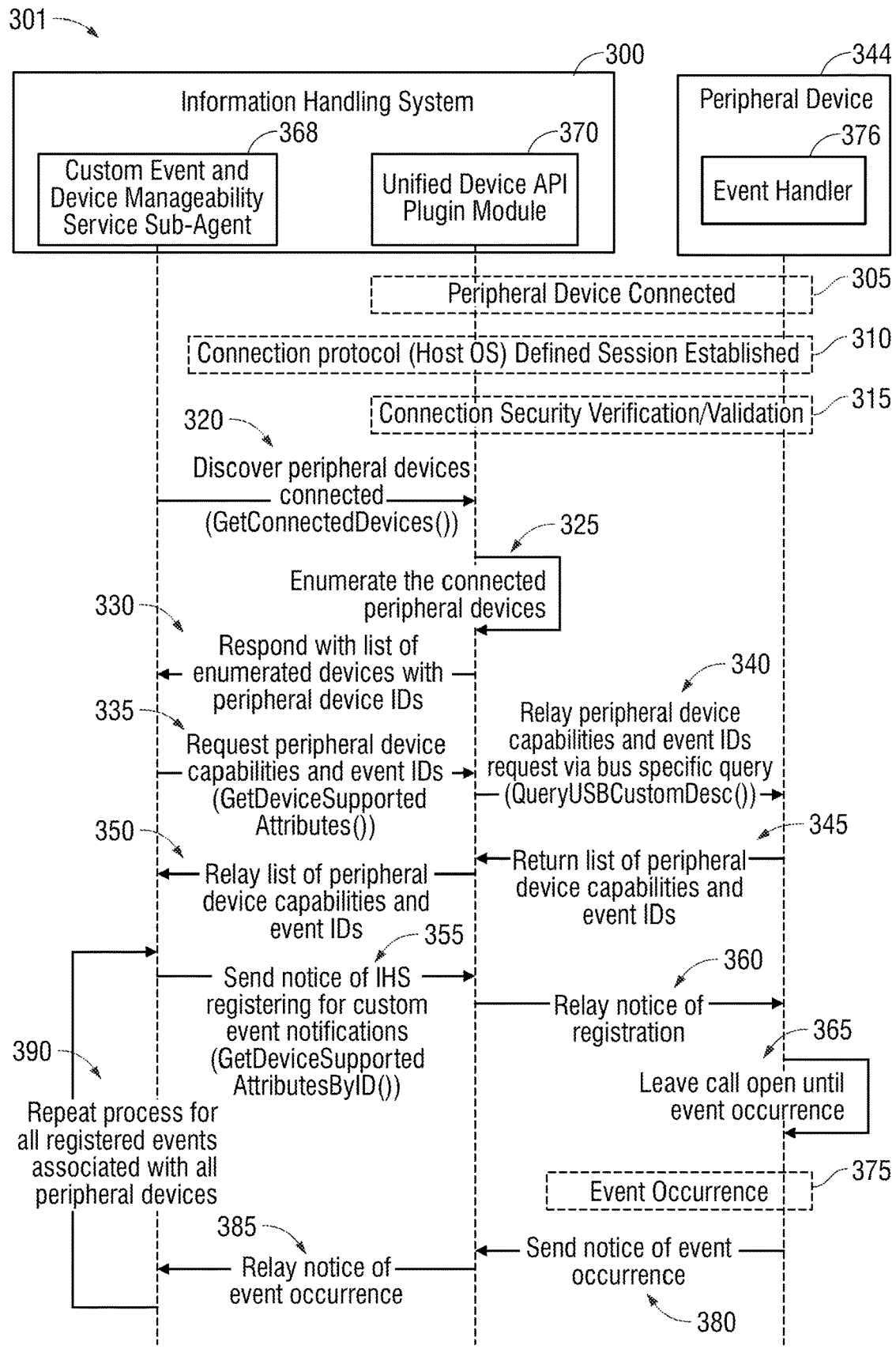
FIG. 3 is a flow chart showing a method of generating custom event notifications from a peripheral device node for communication with a variety of communication protocol types via an information handling node or other node devices according to an embodiment of the present disclosure.

FIG. 3 is a flow chart showing a method 301 of generating custom event notifications from a peripheral device node 344 to another node device such as an information handling system node 300 within a peripheral device workspace according to an embodiment of the present disclosure. As described herein, the systems and methods described herein, allows an information handling system node 300 to register for custom event notifications with the peripheral device node 344 by sending callback messages to the peripheral device node 344 describing which events for capabilities at the peripheral device node 344 that may be monitored for and event notifications generate and received by the information handling system node 300 as well as custom event triggers that trigger the custom event notifications.

The method 301 includes those steps used to operatively couple the peripheral device node 344 to the information handling system node 300. At box 305, the method 301 includes connecting the peripheral device node 344 to the information handling system node 300 via a wired or wireless connection. Where the wireless connection is used, those wireless connection or wired connection bus protocols may be initiated at block 310 with security verification and validation processes being conducted at block 315 as described herein.

At line 320, the method 301 includes a hardware processor of the information handling system node 300 executes the computer-readable program code of the custom event and device manageability service sub-agent 368 to discover the peripheral device nodes 344 operatively coupled to the information handling system node 300 including a unique ID of the peripheral device node 344 using, for example, a GetConnectedDevices( ) command. This discovery process may be initiated after each of the peripheral device nodes such as 344 have been operatively coupled to the information handling system node 300, connection protocols have been defined, and security verifications between the information handling system node 300 and the peripheral device nodes 344 have been completed. The unique IDs of each of the peripheral device nodes 344 may include, in an example embodiment, a make, model, and type of the peripheral device as well as specific identification data such as a serial number that is specific to that peripheral device node 344. The present specification contemplates that other types of identification data may be used to specifically identify each of the peripheral device nodes 344.

At line 325, the execution of the unified device API plugin module 370 may cause the information handling system node 300 to enumerate the connected peripheral device nodes 344. This enumeration process may include simply identifying those peripheral device nodes 344 operatively coupled to the information handling system node 300 via a system bus regardless of the type of bus protocol used in the operatively coupling to the bus driver and bus of the information handling system node 300. At line 330, a response is sent to the custom event and device manageability service sub-agent 368 of a list of enumerated peripheral device nodes 344. In an embodiment, this list may include device IDs associated with each enumerated peripheral device node 344. Alternatively, these device IDs may be requested for and received when the custom event and device manageability service sub-agent 368 requests the peripheral device capabilities and event types that may be monitored for at the peripheral device node 344 as described herein.

At line 335, the custom event and device manageability service sub-agent 368 may request, from each peripheral device node 344, peripheral device capabilities and events that may be monitored for those capabilities as well as event IDs using, for example, GetDeviceSupportedAttributes( ) command. In an embodiment, the information handling system node 300 may execute the computer-readable program code of the custom event and device manageability service sub-agent 368 to request and receive, via execution of code instructions of a unified device API plugin module 370 of the custom event and device manageability service sub-agent 368, peripheral device capabilities and events that may be monitored for those capabilities and the event IDs. In an embodiment, the event IDs describe events that are transmittable via any bus protocol from the peripheral device.

As described herein, typical event notifications are limited by the type of bus protocol used. For example, where the peripheral device node 344 is a webcam, only those events related to the video frames captured by the webcam are sent to the anchor information handling system node because those events sent are limited only to the universal serial bus (USB) video class specifications. In another example where the peripheral device node 344 is a Bluetooth® keyboard, the events sent to the anchor information handling system node (also called an information handling system) are limited to only those events related to key actuations performed by a user at the keyboard because those events sent are limited only to the human interface device (HID) specifications. These bus protocols limit the number and type of potential event notifications that the information handling system node 300 can receive from each of the peripheral device nodes 344. For custom event notifications that are not typically communicated via a typically engaged bus protocol, the execution of the computer-readable program code of the custom event and device manageability service sub-agent 368 causes the information handling system node 300 to implement the unified device API, via execution of the unified device API plugin module 370, that acts as a metadata model and communication protocol to allow developers to communicate various other system's APIs of peripheral device nodes 344 from a variety of manufacturers using differing data formats and communication through a single interface. This allows the information handling system node 300 to communicate the request for the event IDs that describe events that otherwise would not be available to be received by the information handling system node 300 using a single bus protocol such as USB video class specifications or HID to name a few. It is appreciated that the request for event IDs from each of the peripheral device nodes 344 includes a request for peripheral device capabilities and types of events that are monitored for capabilities that include wired and wireless connection capabilities, battery storage capabilities, hardware processor capabilities (e.g., microcontroller capabilities), wireless communication capabilities, and sensor capabilities where sensors are present in a peripheral device, among other capabilities that define potential event notifications that can be received from each peripheral device. At line 340, this request is relayed to the peripheral device node 344 using a QueryUSBCustomDesc( ) command for example. At line 345, the list of peripheral device capabilities, available event types monitoring those capabilities, and event IDs may be sent from the peripheral device node 344 and relayed, at line 350 from the unified device API plugin module 370 to the custom event and device manageability service sub-agent 368.

At line 355, a notification may be sent in the form of a registration command causing the information handling system node 300 to register for event notifications at the peripheral device node 344. In an embodiment, this process may be completed via execution of a GetDeviceSupportedAttrbutesByID( ) command. Again, this command may be relayed via the unified device API plugin module 370 to the peripheral device node 344. To accomplish this, the information handling system node 300 may execute computer-readable program code of a unified device API plugin module 370 to, via a bus driver, register for custom event notifications from each peripheral device node 344. As described herein, a unified device API plugin sub-agent and its event handler 376 allows the information handling system node 300 to communicate with the peripheral device node 344 on any bus protocol in operative coupling to the peripheral device node to complete the processes described herein. Execution of code instructions for the custom event and device manageability service sub-agent 368 at information handling system node 300 may provide for interpretation and tasks as a result of event notifications via the unified device API as well as access and reporting to a cloud orchestrator server managing the peripheral device workspace and facilitating operational policies relating to such custom event notifications.

In an embodiment, a unified device API plugin sub-agent 374 is responsible for communicating the device capabilities and event IDs back to the information handling system node 300 as described herein. The unified device API plugin sub-agent may also cause a microcontroller of the peripheral device node 344 to execute computer-readable program code of the event handler event handler 376. Execution of the event handler 376 by the microcontroller of the peripheral device node 344 also causes the peripheral device node 344 to leave open, at line 365 an event call and monitor for occurrences of an event trigger that satisfies the criteria of the registered event by the information handling system node 300. It is appreciated that these events being monitored for at the event handler 376 not only include typical events that would be received by the information handling system node 300 from the peripheral device node 344 but also those custom events not usually received from such peripheral devices. In the context of the peripheral device being a mouse as described in connection with FIG. 1, for example, typical events may include actuation of a button or movement of a scrolling wheel on the mouse. Those non-typical events may include events that are not generally relayed from the mouse such as a thermal event that describes that a thermal threshold limit has been reached or exceeded, hardware or firmware failure or performance events, or other events monitoring capabilities of the mouse. In one example embodiments, the mouse may include a thermal sensor that would shut down the microcontroller of the mouse so that the microcontroller is not damaged by excessive heat. Where the thermal threshold has been set by the information handling system node 300 during the event registering process, this customized event may be monitored by the event handler 376 such that when the thermal sensor detects that the thermal threshold has been exceeded, sends an event notification to the information handling system node 300 for it to act directly, report to the cloud orchestrator server, or both.

At line 375, the event may occur which sets off the notification process by the event handler 376. This notification is passed onto the information handling system node 300 at lines 380 and 385, being relayed via the unified device API plugin module 370. Execution of code instructions of the custom event and device manageability service sub-agent 168 at the information handling system node 300 may execute to interpret the event notification received via the unified device API plugin module 370 and generate one or more actions at the information handling system node in some embodiments. For example, execution of code instructions of the custom event and device manageability service sub-agent 168 may provide a notification, via the video display device for example, to the user that the microcontroller of the mouse has reached a thermal limit and steps should be taken to remedy this occurrence. In another example embodiment, execution of code instructions of the custom event and device manageability service sub-agent 168 may cause the information handling system node to shut down or limit operation and communication for HID communications with the peripheral device node mouse or implement another operational policy received from the cloud orchestrator server from management by a peripheral device workspace cloud manageability module. In yet another embodiment, the execution of code instructions of the custom event and device manageability service sub-agent 168 may transmit the event notification to the cloud orchestrator server executing the peripheral device workspace cloud manageability module for management purposes. Thus, in the embodiments herein, those events that otherwise would not be available to be transmitted from the peripheral device to the information handling system node 300 using a HID protocol are now transmittable between node devices in a peripheral device workspace via use of the unified device API protocol by the unified device API plugin module 370 as described herein.

In an embodiment, the execution of the event handler 376 by a microcontroller of the peripheral device node 344 may handle any duplicated registered events. In some embodiments, the information handling system node 300 may register for duplicated requests for an event notification. This accidental or unintentional duplication of event registrations may be handled by the event handler 376 deleting or otherwise ignoring these duplicated event registrations thereby reducing the processing resources associated with the operation of the systems and methods described herein.

At line 390, the processes associated with lines 355 through 385 may be repeated for all registered events associated with all peripheral device nodes 344 operatively coupled to the information handling system node 300. As described herein, the systems and methods allow for peripheral device nodes 344 to support events that are outside the scope of the bus protocols for any given device. This allows the information handling system node 300 to be asynchronously notified of customized events on time for a user, for example, to take remedial actions. Additionally, with the operation of the cloud orchestrator server described herein, policies may be used to modify event criteria used in setting the triggering events at the peripheral device node 344 thereby allowing an ITDM to define these event criteria rather than relying on the data maintained on the information handling system node 300 for such modifications. Still further, the systems and methods described herein allow for extended and cohesive seamless workspace experiences using a generic bus protocol (e.g., the unified device API) that can operate on any connected bus.

Figure 4:
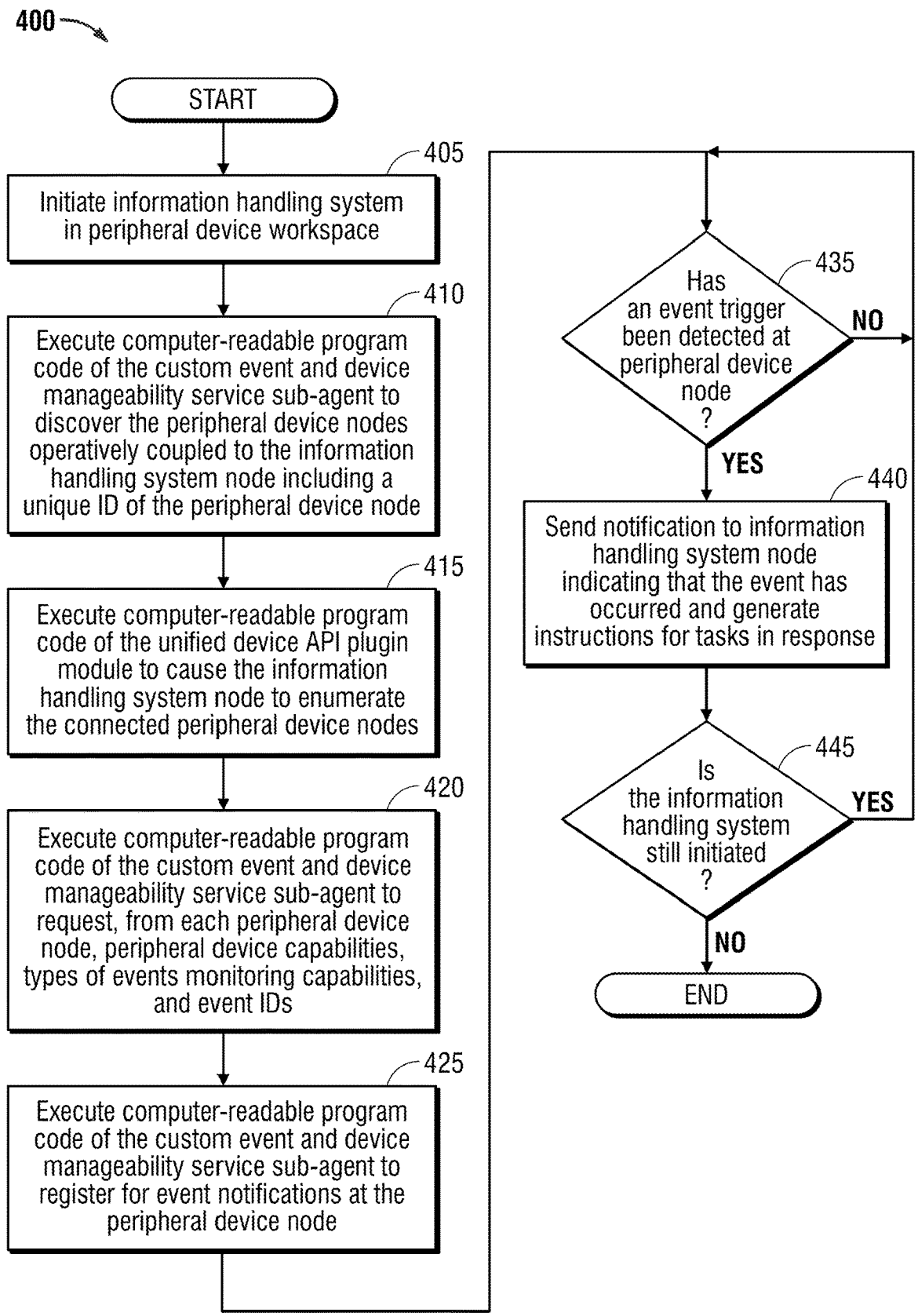
FIG. 4 is a flow chart showing a method of generating custom event notifications from a peripheral device node for communication with a variety of communication protocol types via an information handling node or other node devices according to another embodiment of the present disclosure.

FIG. 4 is a flow chart showing a method 400 of generating custom event notifications from a peripheral device node to an information handling system node or other node device in a peripheral device workspace according to another embodiment of the present disclosure. As described herein, the systems and methods described herein, allows an information handling system node 300 register for custom event notifications with the peripheral device node by sending callback messages to the peripheral device node describing which events to receive notifications about and custom event triggers that trigger the custom event notifications. The systems and methods described herein allow for extended and cohesive seamless workspace experiences using a generic bus protocol (e.g., the unified device API) that can operate on any connected bus to communicate event notices for events monitoring capabilities at peripheral device nodes that may not be otherwise communicated within the peripheral device workspace as well as for events that are in various embodiments.

The method 400 may include, at block 405, initiating the information handling system. This initiation process may include a user actuating a power button that causes a BIOS and OS of the information handling system to be executed in a boot-up process. In an embodiment, the information handling system may also execute computer-readable program code that discovers peripheral device nodes, such as a webcam or a mouse, and executes drivers associated with the peripheral device nodes, such as the webcam or the mouse, so that the information handling system node may send and receive data to and from each peripheral device node.

At block 410, the information handling system may execute computer-readable program code of the custom event and device manageability service sub-agent to discover the peripheral device nodes operatively coupled to the information handling system node including a unique peripheral device ID of the peripheral device node using, for example, a GetConnectedDevices( ) command. Again, this discovery process may be initiated after each of the peripheral device nodes have been operatively coupled to the information handling system, connection protocols have been defined, and security verifications between the information handling system and the peripheral devices have been completed. The unique peripheral device IDs of each of the peripheral device nodes may include, in an example embodiment, a make, model, and type of the peripheral device node as well as specific identification data such as a serial number that is specific to that peripheral device node. The present specification contemplates that other types of identification data may be used to specifically identify each of the peripheral device nodes.

At block 415, the method 400 includes the execution of the unified device API plugin module that causes the information handling system node to enumerate the connected peripheral device nodes. This enumeration process may include simply identifying those peripheral device nodes operatively coupled to the information handling system nodes via a system bus, and network interface device or wireless adapter as relevant to that peripheral device node, regardless of the type of bus protocol used. A response is sent to the custom event and device manageability service sub-agent of a manifest list of enumerated peripheral device nodes. In an embodiment, this list may include peripheral device IDs associated with each enumerated peripheral device. Alternatively, these peripheral device IDs may be requested for and received when the custom event and device manageability service sub-agent requests the peripheral device capabilities and any monitoring for events of those capabilities as described in embodiments herein.

At block 420, the method 400 includes executing code instructions of the custom event and device manageability service sub-agent to request, from each peripheral device node, peripheral device capabilities, types of events available for monitoring of those peripheral device capabilities, and event IDs. In an embodiment, the information handling system may execute the computer-readable program code of the custom event and device manageability service sub-agent to request and receive, via a unified device API plugin module of the custom event and device manageability service sub-agent, these peripheral device capabilities, types of events available for monitoring of those peripheral device capabilities, and event IDs. In an embodiment, the event IDs describe events or occurrences that may be generated, sensed, measured, or monitored at the peripheral device node and that are transmittable via any bus protocol from the peripheral device node.

As described herein, typical event notifications are limited by the type of bus protocol used between the peripheral device node in operations with the anchor information handling system node in a peripheral device workspace. For example, where the peripheral device node is a webcam, only those events related to the video frames captured by the webcam are sent to the anchor information handling system node because those events sent are limited only to the USB video class specifications. In another example where the peripheral device node is a Bluetooth® keyboard, the events sent to the anchor information handling system node (also called an information handling system) are limited to only those events related to key actuations performed by a user at the keyboard because those events sent are limited only to the HID specifications. These bus protocols limit the number and type of potential event notifications that the information handling system can receive from each of the peripheral devices.

Thus, to communicate with non-typical event notifications from peripheral device nodes that might otherwise not be communicated between node devices in a peripheral device workspace, the information handling system node executes code instructions for the custom event and device manageability service sub-agent and a unified device API module in some embodiments. The execution of the computer-readable program code of the custom event and device manageability service sub-agent causes the information handling system to implement the unified device API, via execution of the unified device API plugin module to enable communication of these non-typical event notifications, or even typical event notifications, from any data format or protocol used at a peripheral device node or a variety of data formats and protocols used at peripheral device nodes in a peripheral device workspace in embodiments herein. Execution of code instructions for the unified device API plugin module implements the unified device API which acts as a metadata model and common communication protocol to allow developers to communicate various other system's APIs for a variety of formats for peripheral device nodes from multiple manufacturers with a variety of data protocols and communication protocols through a single interface. This allows the information handling system to communicate the request for the event IDs and event notifications that describe events that otherwise would not be available to be received by the information handling system using a single bus protocol such as USB video class specifications or HID to name a few. It is appreciated that the request for event IDs from each of the peripheral devices includes a request for peripheral device capabilities and events sensed, detected or recorded for monitoring those capabilities including wired and wireless connection capabilities, battery storage capabilities, hardware processor capabilities (e.g., microcontroller capabilities), wireless communication capabilities, and sensor capabilities where sensors are present in a peripheral device, among other capabilities that define potential event notifications that can be received from each peripheral device node to an information handling system node or other device node in a peripheral device workspace. This request is relayed to the peripheral device. This list of peripheral device capabilities, event types for monitoring those peripheral device capabilities, and event IDs may be sent from the peripheral device node and relayed via execution of code instructions of the unified device API plugin module to the custom event and device manageability service sub-agent.

At block 425, the information handling system node may execute computer-readable program code of the custom event and device manageability service sub-agent to register for event notifications at the peripheral device node such that upon receipt of event notifications, the custom event and device manageability service sub-agent may execute one or more tasks as a result of those received event notifications from a peripheral device node. Again, a registration command for event notifications or any commands resulting from the custom event and device manageability service sub-agent may execute one or more tasks as a result of those received event notifications may be relayed via the unified device API plugin module to the peripheral device node. To accomplish this, the information handling system may execute computer-readable program code of a unified device API plugin module to, with code instructions of a bus driver for the bus of the information handling system node, and transmit a registration for custom event notifications from each peripheral device node. As described herein, execution of a unified device API plugin sub-agent and its event handler at a peripheral device node allows the information handling system node to complete the processes for communication of such commands and receipt of event notifications, including non-typical event notifications, as described herein. In an embodiment, a unified device API plugin sub-agent executing at a peripheral device node is responsible for communicating the peripheral device capabilities, event types for monitoring those peripheral device capabilities, and event IDs back to the information handling system node as described herein. The unified device API plugin sub-agent may also cause a microcontroller or other hardware processing resource of the peripheral device node to execute computer-readable program code of the event handler event handler. Execution of code instructions for the event handler by the microcontroller of the peripheral device node also causes the peripheral device to leave open an event call and monitor for occurrences of an event trigger that satisfies the criteria of the registered event by the information handling system node and generates an event notification to be communicated to the information handling system node via the unified device API plugin sub-agent.

It is appreciated that these events being monitored for at the event handler not only include typical events that would be received by the information handling system from the peripheral device but also those custom, or non-typical events not usually received from such peripheral device nodes at another node device in a managed peripheral device workspace. In the context of the peripheral device being a mouse, for example, typical events may include actuation of a button or movement of a scrolling wheel on the mouse. Those non-typical events may include events that are not generally relayed from the mouse such as a thermal event that describes that a thermal threshold limit has been reached or exceeded. In some embodiments, the mouse may include a thermal sensor that would shut down the microcontroller of the mouse so that the microcontroller is not damaged by excessive heat. Where the thermal threshold has been set by the information handling system during the event registering process, this customized event may be monitored by the event handler such that when the thermal sensor detects that the thermal threshold has been exceeded, sends an event notification to the information handling system.

At block 435, the peripheral device node may wait for an event trigger to occur as the peripheral device node determines whether the event trigger has been detected. Where no event trigger has been detected the peripheral device node may hold the event call and monitor for the event until the event trigger has been detected. At block 435, where the event trigger has been detected, the method 400 continues to block 440.

At block 440, the event may occur which sets off the notification process by the event handler of the peripheral device node. This event notification is passed onto the information handling system node by the unified device API sub-agent plugin at the peripheral device node and is relayed via the unified device API plugin module at the information handling system node. Execution of the code instructions for the custom event and device manageability service sub-agent may instruct the information handling system to execute one or more tasks in response to a received event notification or pursuant to one or more received operational policies from the custom event and device manageability service module executing at a managing cloud orchestrator server. In an example embodiment, execution of the custom event and device manageability service sub-agent may instruct the information handling system to provide a notification, via the video display device. For example, notice may be provided to the user that the microcontroller of the mouse has reached a thermal limit and steps should be taken to remedy this occurrence. In another example embodiment, execution of the custom event and device manageability service sub-agent may instruct the information handling system to execute instructions or an operational policy with respect to the notifying peripheral device node. For example, instructions may be triggered or an operational policy may require that the information handling system node reduce or cease usage of the mouse while the microcontroller of the mouse has reached a thermal limit. In yet another example embodiment, execution of the custom event and device manageability service sub-agent may instruct the information handling system to forward the received event notification to the peripheral device workspace cloud manageability orchestrator module executing at a cloud orchestrator server for further management or notification to an ITDM. For example, event notification may be transmitted to the cloud orchestrator server of the thermal limit being reached at the mouse peripheral device node and the custom event and device manageability service module of the peripheral device workspace cloud manageability orchestrator module may execute to notify the ITDM or issue a response operational policy with respect to pausing use of the mouse and requiring use of an alternative cursor control device such as a touchpad or touchscreen to the information handling system node in an example. Thus, in the embodiments herein, those events that otherwise would not be available to be transmitted from the peripheral device to the information handling system using a HID protocol are now transmittable via use of the unified device API protocol by the unified device API plugin module as described herein.

At block 445, the method 400 may include determining whether the information handling system is still initiated. Where the information handling system is still initiated, the method 400 continues to block 435 as described herein. Where the information handling system is no longer initiated at block 445, the method 400 may end.

The blocks of the flow diagrams of FIGS. 3 and 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system node operating in a managed peripheral device workspace, comprising:
   a hardware processor;
   a memory device;
   a power management unit (PMU) to provide power to the hardware processor and memory device; and
   a peripheral device node operatively coupled to the information handling system node;
   the hardware processor to execute computer-readable program code of a custom event and device manageability service sub-agent to:
      discover the peripheral device node operatively coupled to the information handling system including a unique peripheral device identification (ID);
      request and receive, via a unified device application program interface (API) module of the custom event and device manageability service sub-agent, peripheral device capabilities, event types for monitoring device capabilities, and event identifications (IDs), where the event IDs describe custom events that are transmittable via any bus protocol from the peripheral device node to the information handling system node in the peripheral device workspace; and
      register for custom event notifications with the peripheral device node by sending callback messages to the peripheral device node instructing which custom events monitoring peripheral device capabilities to receive custom event notifications about from the peripheral device node and setting custom event triggers that trigger the custom event notifications via the unified device API module.

2. The information handling system node of claim 1 further comprising:
   the hardware processor to execute the computer-readable program code of the custom event and device manageability service sub-agent to send the event IDs to a cloud orchestrator server and request, from a custom event and device manageability service module executing at the cloud orchestrator server, an identification of the custom event.

3. The information handling system node of claim 2 further comprising:
   the custom event and device manageability service sub-agent executing to receive event policies defining the customization of the custom events and operational policies in response to the custom event notification from the cloud orchestrator server executing the custom event and device manageability service module for the information handling system node defining how the event IDs are to be customized for response operational policies to be implemented at the information handling system node upon receipt of the custom event notification.

4. The information handling system node of claim 1 further comprising:
   a bus with the hardware processor executing computer-readable program code of a bus driver to relay the request for event IDs to a unified device API plugin sub-agent at the peripheral device node.

5. The information handling system node of claim 1 further comprising:
   the information handling system to, via the unified device API module, receive the custom event notifications from the peripheral device node as the custom event triggers occur.

6. The information handling system node of claim 5 further comprising:
   the peripheral device node to execute computer-readable program code of an event handler to determine when the custom event triggers have occurred and send the custom event notifications to the information handling system node.

7. The information handling system node of claim 1 further comprising:
   the unified device API module including computer-readable program code of a unified device API that is a developer-agnostic communication protocol that allows the information handling system node to communicate with any peripheral device node operatively coupled to the information handling system node in the peripheral device workspace.

8. The information handling system node of claim 1, wherein the peripheral device node is a smart device node within a created peripheral device workspace by a peripheral device workspace cloud manageability orchestrator module on a cloud orchestrator server and wherein registration for custom event notifications with the peripheral device node causes the peripheral device node to communicate with the cloud orchestrator server to transmit the peripheral device capabilities and event IDs to a custom event and device manageability service module executed by a could orchestrator hardware processing device of the could orchestrator server, and wherein the custom event and device manageability service sub-agent executes to apply received event policies defining the customization of the custom events from cloud orchestrator server to send the event policies to the information handling system node defining how the event IDs are to be customized.

9. A method of generating custom event notifications from a peripheral device node in a peripheral device workspace comprising:
- executing computer-readable program code of a custom event and device manageability service sub-agent with a hardware processing device of an information handling system node for:
  - sending a discovery request to the peripheral device node operatively coupled to the information handling system node in the peripheral device workspace including a unique peripheral device identification (ID) of the peripheral device node;
  - requesting and receiving, via a unified device application program interface (API) module of the custom event and device manageability service sub-agent executing at the information handling system node, peripheral device capabilities, event types for monitoring the peripheral device capabilities, and event identifications (IDs), the event IDs describing custom events that are transmittable via any bus protocol from the peripheral device node to the information handling system node in the peripheral device workspace; and
  - registering for custom event notifications with the peripheral device node by sending callback messages to the peripheral device node describing which custom events monitoring peripheral device capabilities to receive custom event notifications about from the peripheral device node and setting custom event triggers that trigger the custom event notifications via transmission to the peripheral device node with the unified device API module.

10. The method of claim 9 further comprising:
executing the computer-readable program code of the custom event and device manageability service sub-agent with the hardware processor to send the event IDs to a cloud orchestrator server and request from a custom event and device manageability service module executing at the cloud orchestrator server identification of the custom event associated with the custom event notification.

11. The method of claim 9 further comprising:
executing the computer-readable program code of the custom event and device manageability service sub-agent with the hardware processor to send the event IDs to a cloud orchestrator server and request from a custom event and device manageability service module executing at the cloud orchestrator server operational policies for execution by the custom event and device manageability service sub-agent in response to receipt of the custom event notification from the peripheral device node.

12. The method of claim 9 further comprising:
executing computer-readable program code of a bus driver managing a bus at the information handling system via the hardware processor to relay the request for event IDs to a unified device API plugin sub-agent at the peripheral device node.

13. The method of claim 9 further comprising:
receiving, at the information handling system, via execution of the unified device API module, custom event notifications from the peripheral device node as the custom event triggers occur.

14. The method of claim 9 further comprising:
receiving the custom event notifications from the peripheral device node in the peripheral device workspace resulting from executing computer-readable program code of an event handler with a microcontroller at the peripheral device to determine when the custom event triggers have occurred.

15. The method of claim 9 wherein the unified device API module including computer-readable program code of a unified device API that is a developer-agnostic communication protocol that allows the information handling system node to communicate with any peripheral device node operatively coupled to the information handling system node in the peripheral device workspace.

16. The method of claim 9 further comprising:
executing the computer-readable program code of the custom event and device manageability service sub-agent with the hardware processor to define customization of the custom events from an internet technology decision maker (ITDM) from the cloud orchestrator server, wherein the custom event and device manageability service sub-agent receives the event policies defining the custom event to the information handling system defining how the event IDs are to be customized for monitoring capabilities at the peripheral device node in the peripheral device workspace.

17. An information handling system node forming a workspace with a plurality of peripheral device nodes at a location, comprising:
- a hardware processor;
- a memory device;
- a power management unit (PMU) to provide power to the hardware processor and memory device; and
- the plurality of peripheral device nodes operatively coupled to the information handling system;
- the hardware processor to execute computer-readable program code of a custom event and device manageability service sub-agent to:
  - discover the plurality of peripheral device nodes operatively coupled to the information handling system including a unique peripheral device identification (ID) of each of the plurality of peripheral device nodes;
  - request and receive, via execution of code instructions of a unified device application program interface (API) module of the custom event and device manageability service sub-agent, peripheral device capabilities, event types for monitoring the peripheral device capabilities, and event identifications (IDs) from each of the plurality of peripheral device nodes, the event IDs describing custom events that are transmittable via any bus protocol from each of the plurality of peripheral device nodes; and
  - register for custom event notifications with at least one of the plurality of peripheral device nodes by sending callback messages to the at least one of the plurality of peripheral device nodes describing which custom events to receive custom event notifications about and setting custom event triggers that trigger the custom event notifications at the at least one of the plurality of peripheral device nodes; and the information handling system node to, via the unified device API module, receive custom event notifications from the plurality of peripheral device nodes as custom event triggers occur at those peripheral device nodes within the peripheral device workspace.

18. The information handling system node of claim 17 further comprising:

the hardware processor to execute the computer-readable program code of the custom event and device manageability service sub-agent to send the event IDs to a cloud orchestrator server and request from a custom event and device manageability service module identification of the custom event associated with the custom event notification.

19. The information handling system node of claim 18 further comprising:

the hardware processor to execute the computer-readable program code of the custom event and device manageability service sub-agent to send the event IDs to a cloud orchestrator server and request from a custom event and device manageability service module operational policies for execution by the custom event and device manageability service sub-agent in response to receipt of the custom event notification from the peripheral device node.

20. The information handling system node of claim 17 further comprising:

the information handling system to, via the unified device API module, receive custom event notifications from the plurality of peripheral devices as the custom event triggers occur due to the plurality of peripheral device nodes each executing computer-readable program code of an event handler at respective peripheral device nodes to determine when the custom event triggers have occurred and send the custom event notifications to the information handling system node.

* * * * *